(12) United States Patent
Saha et al.

(10) Patent No.: US 11,467,948 B2
(45) Date of Patent: Oct. 11, 2022

(54) DEVICE VIRTUALIZATION AND SIMULATION OF A SYSTEM OF THINGS

(71) Applicant: DOPPELIO TECHNOLOGIES PRIVATE LIMITED, Bangalore (IN)

(72) Inventors: Sharmila Saha, Bangalore (IN); Gaurav Johri, Bangalore (IN); Srinivas Rao Bhagavatula, Bangalore (IN); Rajesh Kathirvelu, Bangalore (IN)

(73) Assignee: DOPPELIO TECHNOLOGIES PRIVATE LIMITED, Bangalore (IN)

( * ) Notice: Subject to any disclaimer, the term of this patent is extended or adjusted under 35 U.S.C. 154(b) by 4 days.

(21) Appl. No.: 17/102,437

(22) Filed: Nov. 24, 2020

(65) Prior Publication Data

US 2022/0075708 A1 Mar. 10, 2022

(30) Foreign Application Priority Data

Sep. 10, 2020 (IN) .............................. 202041039081

(51) Int. Cl.
*G06F 11/36* (2006.01)
*G06F 9/455* (2018.01)
*G06F 9/54* (2006.01)

(52) U.S. Cl.
CPC .......... *G06F 11/3664* (2013.01); *G06F 9/455* (2013.01); *G06F 11/3684* (2013.01); *G06F 11/3688* (2013.01); *G06F 9/54* (2013.01)

(58) Field of Classification Search
None
See application file for complete search history.

(56) References Cited

U.S. PATENT DOCUMENTS

| 10,296,301 | B2* | 5/2019 | Maluf | H04L 41/12 |
| 11,012,814 | B2* | 5/2021 | Kim | G06Q 50/10 |
| 2016/0173349 | A1* | 6/2016 | Sankar | H04L 43/50 |
| | | | | 709/224 |
| 2016/0359664 | A1* | 12/2016 | Malegaonkar | H04L 67/12 |
| 2017/0364612 | A1* | 12/2017 | Broodney | G06F 30/20 |
| 2018/0246801 | A1* | 8/2018 | Krauss | G06N 20/00 |

(Continued)

OTHER PUBLICATIONS

Google-IoT, "Devices, configuration, and state", 2019, Google, (Year: 2019).*

(Continued)

*Primary Examiner* — Hossain M Morshed
(74) *Attorney, Agent, or Firm* — Yantra Patents LLC; Anand P. Narayan

(57) ABSTRACT

Described herein is a system for device virtualization and simulation of the behaviour of a system of things for testing IoT applications. The aforementioned system comprises a modelling engine, a test suite designer, a simulation engine, and a reporting engine. The modelling engine defines the attributes, data transfer protocols and normal data behaviour of any physical device, and for defining virtual devices that can co-exist with actual devices and can be used to simulate both the things themselves as well as the gateway and the network. The test suite designer defines the device data behaviour under various test conditions. The simulation engine generates test data streams for various test scenarios as required by the software tester. The reporting engine generates various types of test reports.

21 Claims, 27 Drawing Sheets

(56) References Cited

U.S. PATENT DOCUMENTS

| | | | | |
|---|---|---|---|---|
| 2018/0262533 | A1* | 9/2018 | McCaig | H04L 63/1441 |
| 2019/0068455 | A1* | 2/2019 | Randolph | H04W 4/38 |
| 2020/0065123 | A1* | 2/2020 | Yang | G06F 9/455 |
| 2020/0336548 | A1* | 10/2020 | Kunjukrishnan | H04L 67/12 |
| 2021/0096824 | A1* | 4/2021 | Stump | G06F 11/3684 |
| 2021/0103514 | A1* | 4/2021 | Das | G06F 11/3688 |
| 2021/0144210 | A1* | 5/2021 | Kolhapure | H04L 69/18 |
| 2021/0200501 | A1* | 7/2021 | Stankoulov | G06F 3/0488 |
| 2021/0208571 | A1* | 7/2021 | Thomsen | G06Q 50/04 |
| 2021/0240462 | A1* | 8/2021 | de Jong | H04L 67/34 |

OTHER PUBLICATIONS

Cunha, "Low Code Solution for IoT Testing", 2019, Universidade Do Porto (Year: 2019).*
Kim, "IoT-TaaS: Towards a Prospective IoT Testing Framework", 2018, IEEE (Year: 2018).*
Ramprasad, "EMU-IoT—A Virtual Internet of Things Lab", 2019, IEEE (Year: 2019).*
Devices "configuration ,Google-IoT,", 2019, https://cloud.google.com/iot/docs/concepts/devices (Year: 2019).*
Kim, "IoT-TaaS: Towards a Prospective IoT Testing Framework", 2018, IEEE Access (Year: 2018).*

\* cited by examiner

DEVICE VIRTUALIZATION AND SIMULATION OF A SYSTEM OF THINGS

TECHNICAL FIELD OF THE INVENTION

This invention in general relates to testing of systems, and specifically refers to testing of internet of things (IoT) applications.

BACKGROUND

As IoT projects are moving from proof of concept to large scale deployments, software development and testing community is feeling the real pain involved in shipping reliable & scalable IoT applications. Decades of previous experience in testing application and embedded systems software doesn't suffice as the technical and practical complexities involved in IoT are of a different nature.

Traditional applications run in controlled environments with limited set of inputs and state transitions. Whereas IoT applications rely on sensory inputs from diverse and heterogeneous devices collected over unreliable networks eventually make decisions and taking actions that create impact the real world with lesser and lesser human intervention. The failure points are many; sensor reading, power fluctuations & failures, networks issues, security breaches, uncontrolled complex real-world events, extremely large-scale deployments, etc.

Due to all the above reasons, testing of IoT Applications is a more complex exercise than earlier applications.

SUMMARY OF THE INVENTION

The present invention is a system for modelling virtualized instances of physical devices and for generating data doubles for testing of software that interfaces with IoT devices. The system comprises (a) Modelling engine, for defining the attributes, data transfer protocols, normal data behaviour and other characteristics of any physical device (b) Test suite designer for defining the device data behaviour and other characteristics under various test conditions (c) Simulation engine to generate test data streams for various test scenarios as required by the software tester (d) Reporting engine for generating various types of test run reports.

The virtual device models are referred to as Doppel Models in this document. The Doppel Models may be data doubles of physical devices or virtualised instances of physical devices. The Doppel Models can be defined by specifying the characteristics of the devices or by deriving them from a recorded data stream of a physical device. The simulation engine generates real world and anomalous data for testing the software that interfaces with the IoT devices for various scenarios, performance and scale by running the Doppel Models. Anomalies include faulty data and network patterns. The Modelling and Simulation Engine can be used to model discrete IoT devices or an interconnected system of devices to simulate real world behaviour more accurately. A test suite consists of test cases which in turn consist of test steps. The test steps help define behaviour of the device over time, which are then played back to generate real and anomalous data streams of one or several Doppel Models. A simulation run can either be triggered from with the system or by invoking the APIs exposed by the system.

The system is designed as a low code system and the user can do everything within the system without having to write any programming code. The system has provision for incorporating user defined logic in the form of scripts or functions to address very complex scenarios. The system is designed to handle the needs of any industry vertical and is horizontal in nature. The system is available as a cloud software-as-a-service and can be integrated with any of the industry standard test and continuous integration/continuous deployment (CI/CD platforms).

The system disclosed herein is an IoT Data Simulation Platform that helps in building reliable and scalable IoT solutions. The focus of the aforementioned system is to mimic IoT devices or an interconnected system of IoT devices and generate the test data streams and scenarios that are required to test the IOT applications for functionality, performance, security and scale and to provide a mechanism to execute repeatable simulations to rigorously and continuously test the applications. It allows the engineering teams to move faster by eliminating the dependency on physical devices, recorded data or frequent access to real test environments.

BRIEF DESCRIPTION OF DRAWINGS

The foregoing summary, as well as the following detailed description of the invention, is better understood when read in conjunction with the appended drawings. For illustrating the invention, exemplary constructions of the invention are shown in the drawings. However, the invention is not limited to the specific components disclosed herein. The description of a component referenced by a numeral in a drawing is applicable to the description of that component shown by that same numeral in any subsequent drawing herein.

DETAILED DESCRIPTION OF THE INVENTION

Definition of Terms

Doppelio: Doppelio is a Test Automation Platform for IoT applications that can run on a suitable processing infrastructure on cloud, or within a customers' data centre.

Doppel Model: A 'Doppel Model' is a model of a physical Device or a Thing including its data characteristics over time. A Doppel Model is similar to a "Data Twin" of a physical device.

Doppel: An instance of a Doppel Model

Doppel Function: A Doppel Function is an inbuilt data generator function provided by Doppelio for generating data using random, mathematical, statistical or device specific functions Doppel Virtual Machine/DVM: Doppelio provides libraries and tools to virtualise the firmware image of a device that can run on actual hardware and run it on top of commodity hardware or virtualization constructs like Virtual machines/Containers/etc. The layer that facilitates the CPU emulation and hardware virtualization is referred to as the Doppel Virtual Machine (DVM)

Figure 1:
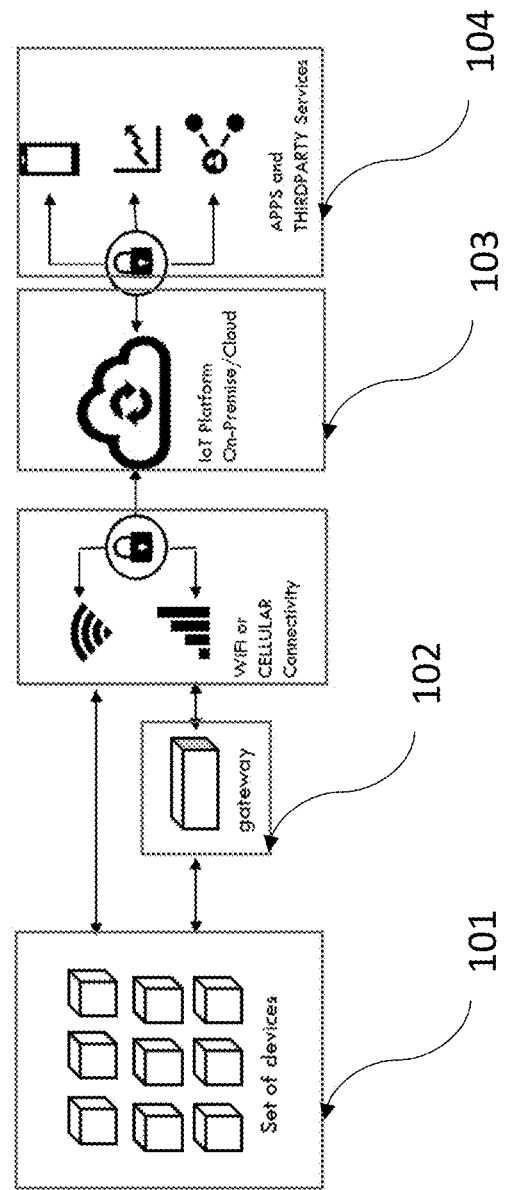
FIG. 1 illustrates a typical existing system in an IoT application.

FIG. 1 illustrates a typical existing system in an IoT application. A multitude of devices/Things 101 connect to the IoT Platform 103 either directly or via IoT gateway devices or proxies over a variety of networks. The applications, for example monitoring and control applications, collect data from the devices/things periodically and then process the data to either control or report or alert or take any other action.

Figure 2:
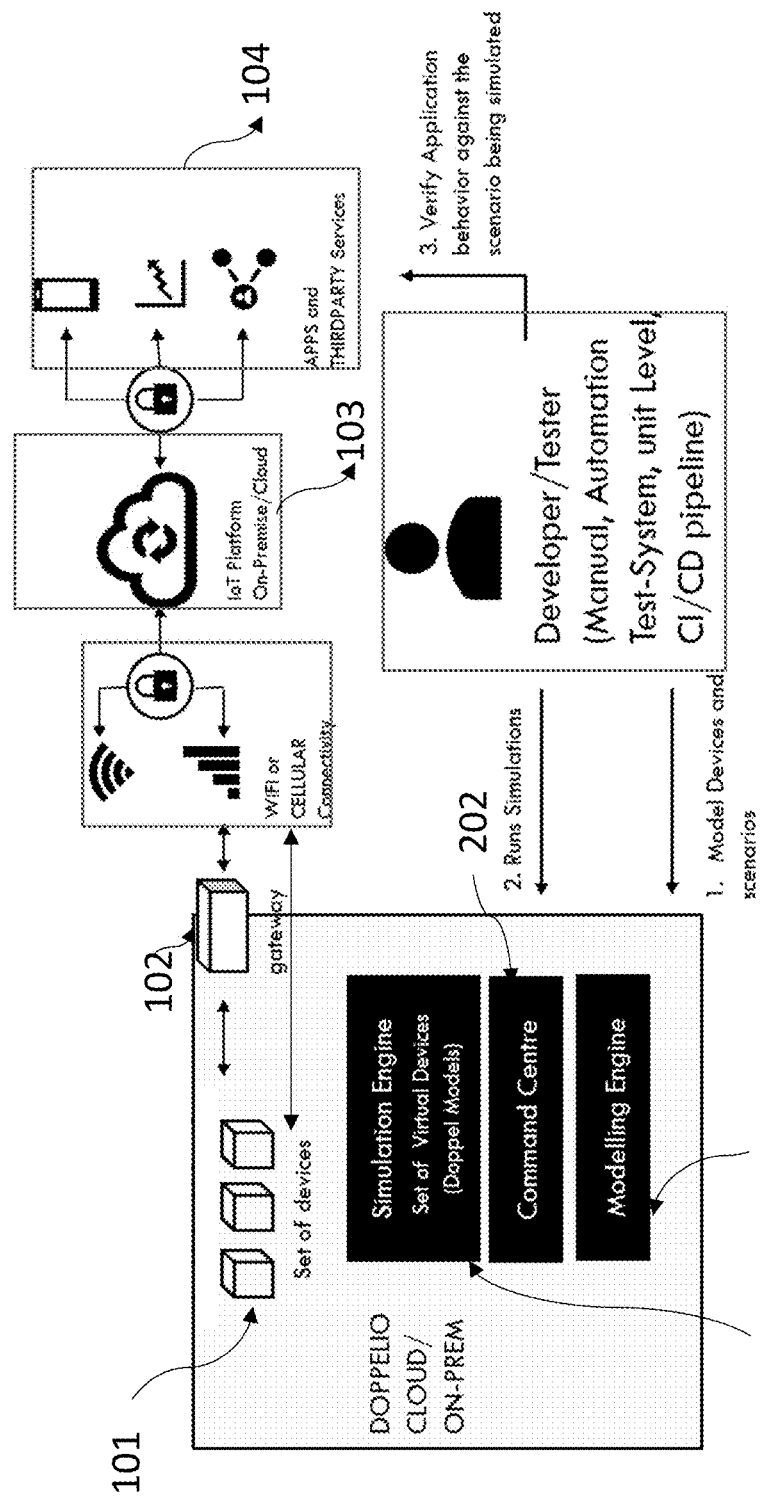
FIG. 2 illustrates an IoT Application environment using Doppelio.

FIG. 2 illustrates an IoT Application environment using Doppelio. Virtual devices, also referred to herein as Doppels, defined by Doppel Models, can co-exist with actual devices 101 and can be used to simulate the things themselves as well as the gateway 102 and the network as shown above.

Described herein is a system for device virtualization and simulation of the behaviour of a system of things for testing IoT applications 104. The aforementioned system comprises a modelling engine 201, test suite designer, simulation engine 203 and reporting engine. The modelling engine 201 defines the attributes, data transfer protocols, normal data behaviour and other characteristics of any physical device 101 and for defining virtual devices that can co-exist with actual devices 101 and can be used to simulate both the things themselves as well as the gateway 102 and the network. The test suite designer defines the device data behaviour under various test conditions. The simulation engine 203 generates test data streams for various test scenarios as required by the software tester. The reporting engine generates various types of test reports.

For brevity, the system for device virtualization and simulation of the behavior of a system of things for testing IoT applications is called Doppelio.

Doppelio is a software application that can run on a suitable processing infrastructure on cloud, or within a customers' data centre.

The Doppelio modelling engine, performs the following modelling activities.

Modelling a device or a thing 101 including its data characteristics over time as a Doppel Model Modelling the faulty behavior of a device or thing 101 including the network Modelling a system of things or devices 101, which include interactions and inter-dependencies between devices/things 101 to model real-life scenarios Modelling topology to facilitate and model system of devices 101

Modelling test scenarios to verify the application behaviour based on time and environmental conditions The Doppelio command centre 202 provides a user interface (UI) based Application and/or APIs for creating models, test scenarios, executing the tests, and generating reports. The developer or tester 105 uses the command centre for interacting with Doppelio. The entire process of modelling and execution, including complex cases can be executed with almost no code, making this a very low code solution. In addition, option is also provided for creating user defined logic where required.

The simulation engine or the execution engine, executes a simulation or a test as per the test scenarios created for testing the application under test. A simulation or test may include one or many Doppel Models and virtual devices. The simulation engine 203 performs the following functions:

Instantiates/creates virtual devices based on the Doppel Models involved in the test. For example, a test scenario may want to verify the application behaviour when there are 1000 vehicles on the road. Hence first 1000 Virtual Vehicles will be created based on the Vehicle Doppel Model.

Runs the tests as per the test scenarios modelled for the duration or condition specified by user. The simulation engine runs the tests by powering up any required processing instances without user intervention using on-demand scaling techniques.

A test scenario comprises of multiple test steps to simulate real-life conditions. Each test step defines some test or operating conditions for a certain period of time. For example, Step 1: Power up a motor and let motor run normally, Step 2: Generate linearly increasing vibration fault, Step 3: Ramp down and stop the motor.

For each virtual device that is part of the test, the data behaviour including faults is calculated for each of its sensors at periodic intervals. This calculated data is then sent as telemetry data to the application under test using protocols such as MQTT, HTTP or any other through optionally a gateway and an IoT Broker, over a network such as cellular, wireless Lan, broadband and so on.

Collate the test reports, statistics and optionally save the telemetry data for re-running regression tests using the same generated data In the context of IoT, an IoT device/thing 101 sends telemetry or house-keeping or alarm data at predefined intervals or on exception basis to an IoT application 104 and handles commands/instructions from the application. The devices/things 101 send data and optionally handle instructions as long as they are alive. The device/thing 101 can refer to a single sensor, actuator or a collection of sensors and actuators.

Doppelio models the "Data Behaviour" of a device/thing 101 for consumption by an IoT Application 104. The physical and other characteristics of the device/thing 101 are not modelled unless they impact the data behaviour of the device/thing 101. Doppelio defines a generic template for modelling any device/thing 101. The model thus created is referred to as a "Data Twin" or a "Doppel Model" of the device or thing 101. In short, any device/thing 101 that generates periodic data and accepts commands can be modelled using the generic template.

The actual devices that participate in a test are created by instantiating the Doppel Models and are termed as Virtual Devices.

A few examples of Devices/Things 101 that can be modelled are:
- A standalone Sensor such as temperature sensor, humidity sensor, motion sensor
- A device such as an energy meter, water meter, compressor that is controlled by a programmable logic controller (PLC)
- A part of an equipment such as an air handling unit (AHU) in a heating ventilation and air conditioning (HVAC) system
- A vehicle, a shopping cart or a fork lift that is moving An IoT gateway 102 aggregates or processes data from sensors/nodes attached to it. The gateway 102 can be a stand-alone entity such as a mobile phone or an IoT Gateway or can be mounted inside a vehicle for instance.

Figure 3:
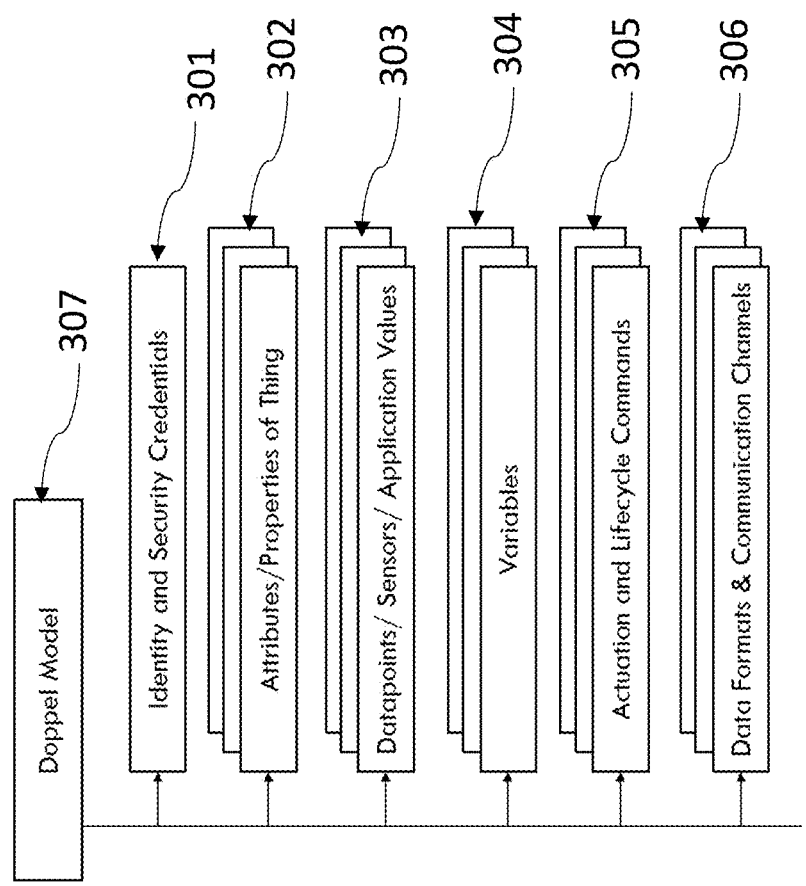
FIG. 3 illustrates the constituents of a Doppel Model.

FIG. 3 illustrates the constituents of a Doppel Model 307, comprising identity, attributes, datapoints or sensors, variables, actuation commands and commands and formats of the data and communication channel.

Identity 301 comprises information including security credentials, for example, name, data sheet, a certificate, a key, firmware image details, or other data required to connect to the application being tested.

Attributes 302 are read-only parameters that better describe the device/thing and which may impact the data behaviour of the device, for example, a compressor model, average mileage (kmpl) of the vehicle and so on.

Datapoints 303 describe the various sensors that are part of the device/thing or quantities being measured and reported by the device/thing, for example in a chiller the sensors can be condenser pump status, temperature set point, evaporator inlet temperature and so on. The datapoints may be physical sensors or application defined values.

Variables 304 describe the dynamic or environment conditions that impact the data behaviour of the device and the test execution. For example, the location of the device, the destination of a vehicle, speed of the vehicle, power factor of a motor and so on.

Actuation commands 305 are commands that the device/thing receives from the application under test, or from other external sources, and, for example include, set temperature, start compressor.

The format 306 of the data and the communication channels for sending the telemetry or out-of-band data to the application for example, temperature or current value over MQTT (Message Queuing Telemetry Transport) protocol or Water Level over Modbus protocol. Data formats 306 define the format by which the payload must be sent, and communication channels define by what means the payload must be sent. By defining the data formats 306 generically, it is therefore possible to handle different kinds of devices/things and their data requirements.

In addition to generating telemetry or out-of-band data, a virtual device when instantiated also participate in lifecycle events such as register/unregister device 101, authentication and others as required by individual applications or application framework platforms.

Apart from modelling the device characteristics as described above, one of the key requirements for simulating real-life behaviour is the ability to generate realistic data based on subject matter knowledge, environmental or device conditions which vary with time. The ability to generate realistic data easily is one of the key differentiators with respect to other platforms.

Doppelio provides the ability to model the data behaviour of each of the datapoints using recorded, statistical, spatial or temporal models as follows:

Constant value is a value that is constant but can vary over time. For example, ignition value is initially 0 but when the vehicle starts moving, ignition value is 1 to indicate motion.

Using an inbuilt data generator (Doppel Function) from a rich library of custom data generators that include mathematical as well as device specific generators. Examples include a drive function to drive a virtual vehicle (virtually) from source to destination, power consumption calculator to calculate the power consumed by an electrical device, gaussian normal distribution, relative random value, obtaining live temperature or humidity values of a place and so on.

Using a function defined by user (UDF) with custom logic for very specific behaviour written in a scripting language such as JavaScript, which is easy to create and understand. For example, to calculate water flow or count no. of people and so on.

Obtaining a value from predefined Data Sets or recorded Data Streams using best fit and extrapolation techniques Event triggers such as actuator messages or commands, alter the data behavior of a data point, set of data points or other characteristics of the device. For example, consider an application switches on a chiller because of high temperature detected. Switching on the chiller then impacts all the other datapoints of the chiller.

The datapoints may be inter-dependent on each other, for example fuel consumed by a vehicle is directly proportional to the distance travelled and speed (or gear)

Figure 4:
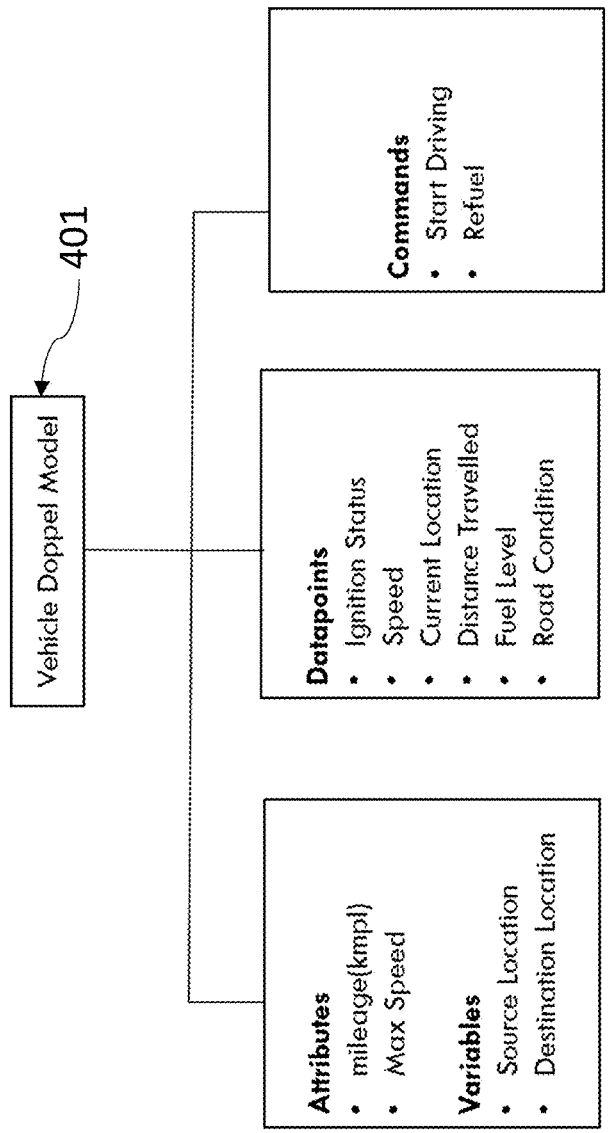
FIG. 4 exemplifies a Doppel Model for a vehicle application.

Some datapoint values can be therefore "derived" from other data point values. For example, the distance travelled by a vehicle may be derived when the virtual vehicle drives from source to distance FIG. 4 exemplifies a Doppel Model 307 for a vehicle application. Let us take an example of a vehicle Doppel Model 401 to illustrate both a Doppel Model 307 as well as its data behaviour as shown in FIG. 4. For illustration purposes, only a subset of Doppel Model 307 is shown in FIG. 4

The method of data modelling for each of the datapoints of the Vehicle Doppel Model is described below:

Ignition Status can be modelled as a Constant Value Datapoint. It has a value or Off/0 when the vehicle is off and On/1 when the vehicle is on. The vehicle can be made "On" either by initializing the same in a Test Step or when application sends a command to "Start Driving"

Figure 5:
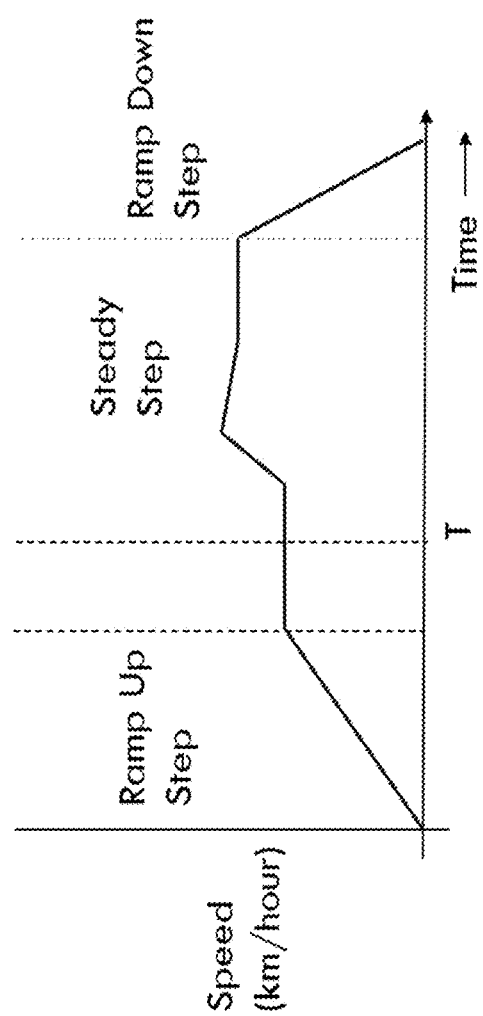
FIG. 5 illustrates a Doppel function for data monitoring.
Figure 6:
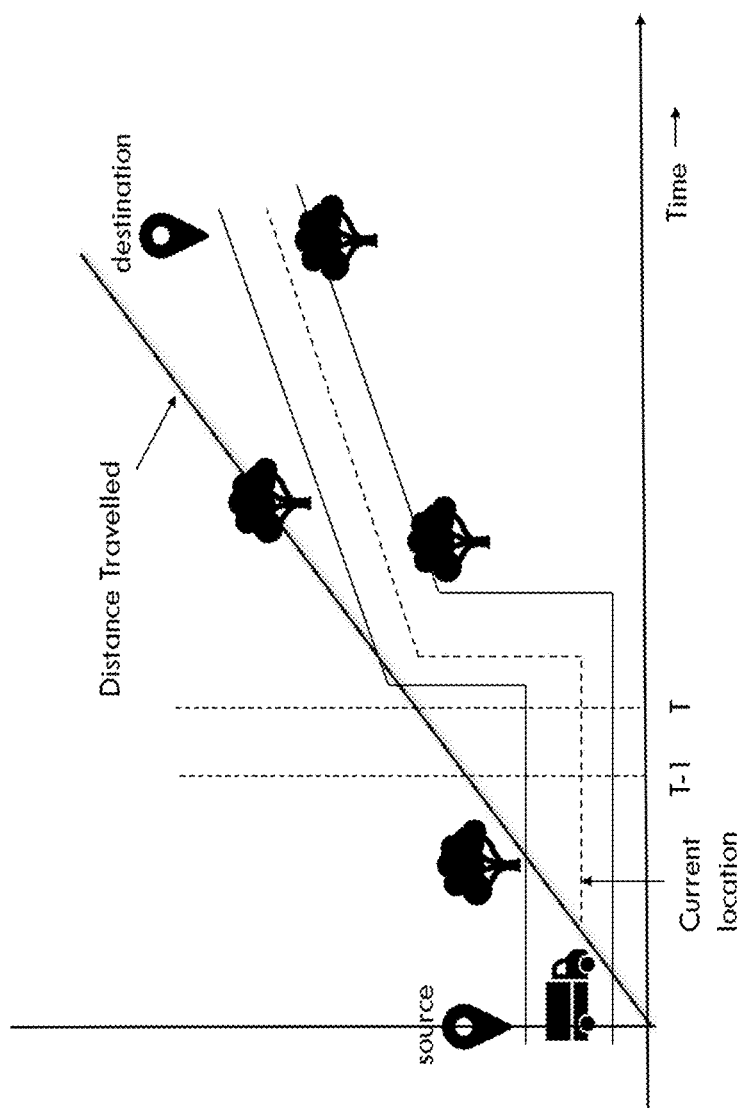
FIG. 6 illustrates a Doppel function and derived data modelling.

FIG. 5 illustrates an inbuilt data generator (Doppel Function) function for modelling speed of the vehicle. The speed of the virtual vehicle can be simulated using inbuilt mathematical Doppel Functions over different segments of time as shown in FIG. 6. For illustration purposes, the graphs are shown as straight lines. In actual conditions, there will be a variation around the mean values.

Figure 7:
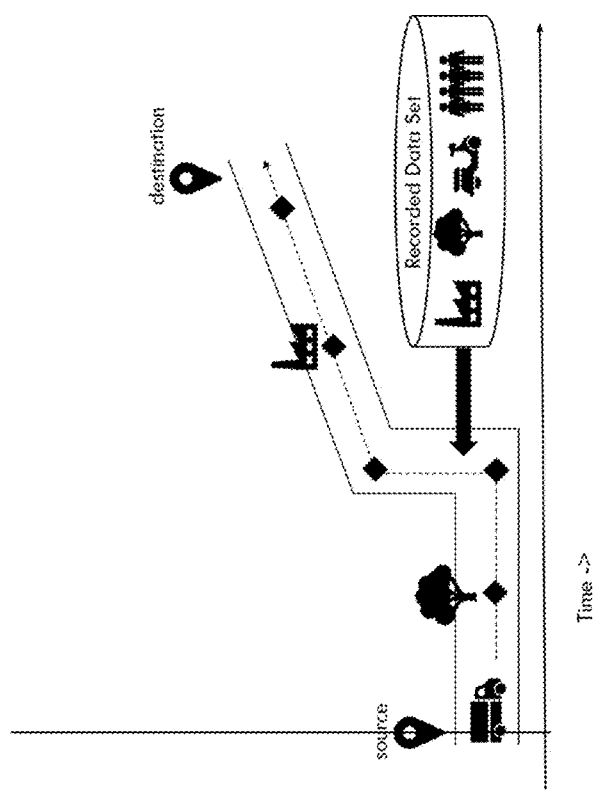
FIG. 7 illustrates an example of a data set for data modelling.

FIG. 6. illustrates a Doppel function and derived data modelling. The "current location and distance travelled" datapoints can be modelled using one of the Doppel Functions as illustrated in FIG. 7. The distance travelled indicates the distance travelled on road from the source location and depends on the current location.

The current location (GPS coordinates) of the virtual vehicle, depicted as the dark dashed line in FIG. 6, changes as the virtual vehicle drives from source to destination using the inbuilt Doppel Function 'drive'. Both the source and destination are configured as variables.

At any point of time 'T', the next location is calculated using the speed of the vehicle at time 'T' (as shown in FIG. 6) and the recalculated route from a GPS map provider (configurable). During this process, the actual distance travelled is calculated using the speed and the "on-road distance" between previous location and current location. Hence current location is dependent on Speed and Ignition Status. It also sets the value of distance travelled datapoint as a derived data point.

Fuel level can be calculated using an inbuilt Doppel Function or a User Defined Function with more custom logic. It depends on distance travelled, speed and average mileage of the vehicle.

Road condition is an image Datapoint from a camera sensor mounted on board the vehicle. FIG. 7 illustrates an example of a data set for data modelling. It can be simulated by using a Recorded Data Set i.e. playback from previously recorded images as shown in FIG. 7. The road condition image can be evaluated at a less frequent time interval than other data points to conserve bandwidth data.

Figure 8:
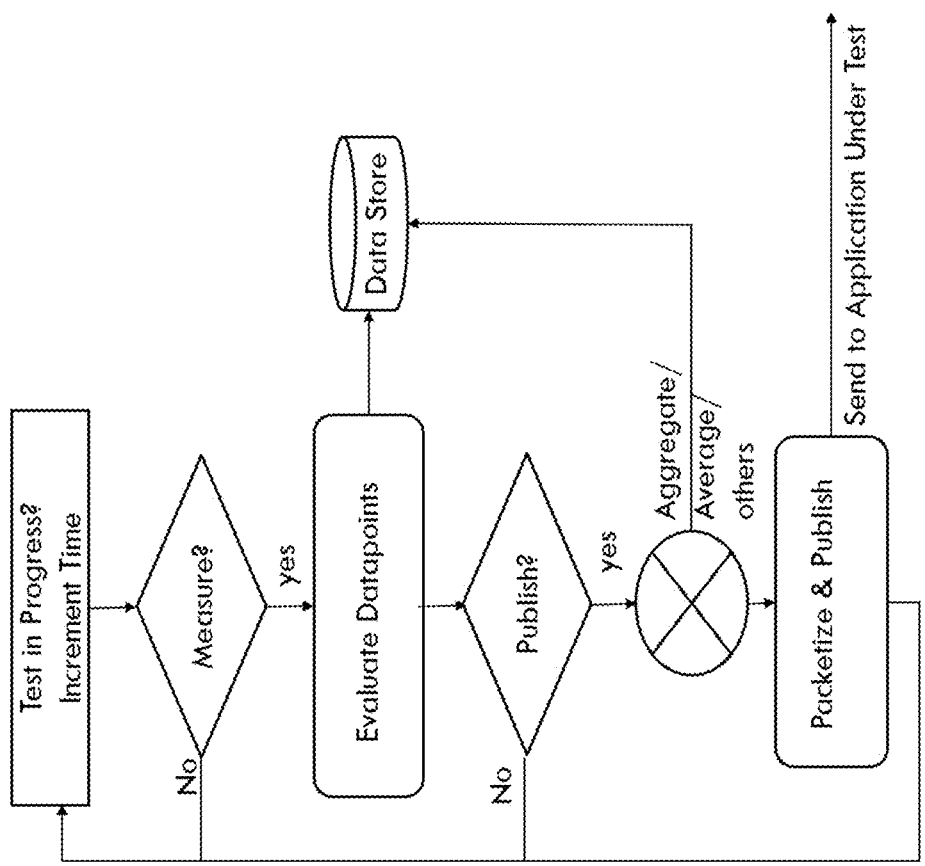
FIG. 8 illustrates a process flow for measure and publish.

FIG. 8 illustrates a process flow for measurement and publishing of telemetry data. The data behavior of each Datapoint or set of Datapoints of a Doppel Model can be flexibly modelled using a variety of mechanisms. To model real-life conditions, the datapoints may depend on each other and external data sources. The value of each datapoint is calculated at every time 'T' as per the measurement interval configured by the application. The Values thus calculated are then packetized and sent as telemetry data to the application under test at periodic Intervals (Publish Interval). The Measurement Interval and Publish Interval may differ. Packetization for publishing to the application may in some cases also include aggregation or averaging the values calculated in the defined measurement time interval. For example, the power consumed by a motor may be calculated every 20 seconds, but every 2 minutes, the average power consumed is sent to the application. The time interval may be different each of the datapoints. The time interval for measurement and publish to application may also be different The method of modelling faulty behavior of devices/things is described herein. IoT Applications depend on data from devices, the device's sensors and networks for their proper functioning. In an ideal environment, the devices always send accurate data and networks never fail. In real life however, devices do fail and network faults are common. Hence testing application behavior when the data sent is incorrect or when network is faulty or patchy needs to be verified thoroughly.

Doppelio generates 'faults' using an inbuilt library of fault generators for different kinds of data such as no data, linear increase, high threshold, no change etc. and network faults such as bandwidth throttling, packet drops and delays. These faults can be configured as part of the test scenario to create interesting situations such as detection of a potential failure in a motor or detection of faulty sensor and so on.

Figure 9:
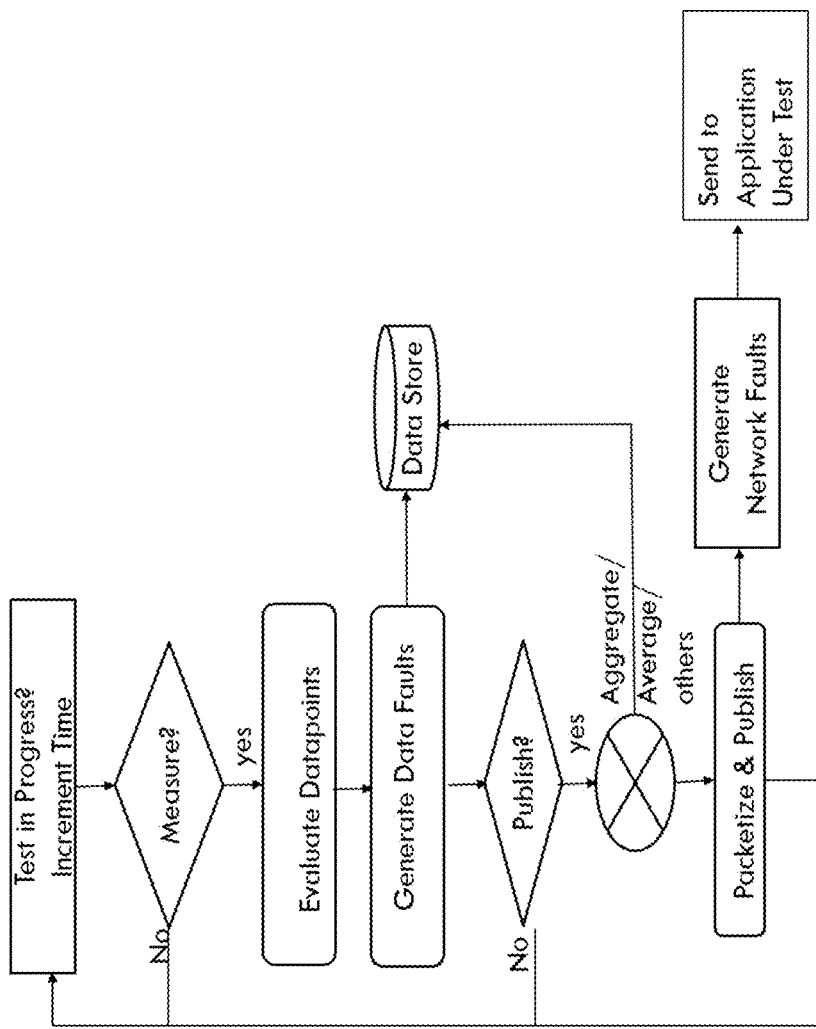
FIG. 9 illustrates a process flow with data and network faults.

FIG. 9 illustrates a process flow with data and network faults. The generation of data/network faults is optional.

Figure 10:
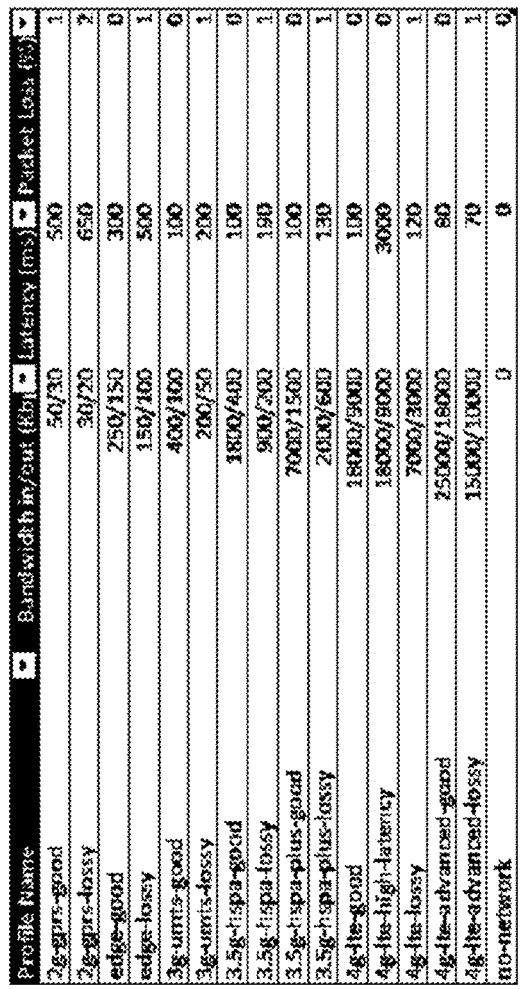
FIG. 10 exemplarily illustrates the network characteristics of a cellular network.

FIG. 10 exemplarily illustrates the network characteristics of a cellular network. Depending on the network chosen, the bandwidth, latency and packet loss can be characterized and controlled as shown in FIG. 10.

The following exemplify faults using the Vehicle Doppel Model:

The GPS data fault is described as follows. Let us assume that the application has an algorithm to calculate total area covered by a vehicle. To test this algorithm, data needs to be collected from the Vehicle and then processed. When the vehicle travels from source to destination, the vehicle sends its current location to the application as an aggregation of points over a configured interval. If the configured interval is 1 minute and measurement granularity is 5 secs, the application expects 12 distinct points every minute in an ideal situation.

Now, the vehicle may pass between various zones which have poor connectivity, good connectivity and in some cases no connectivity at all. By adding the inbuilt GPS Data Fault generator for the Current Location datapoint, depending on the GPS connectivity and speed of vehicle, the application will at times receive no coordinates, lesser number of coordinates than expected, multiple same coordinates, corrupted coordinates, outliers and so on. Hence by adding the GPS fault generator, the application can be tested for resilience against faulty data as is likely in a real-world situation.

Figure 11:
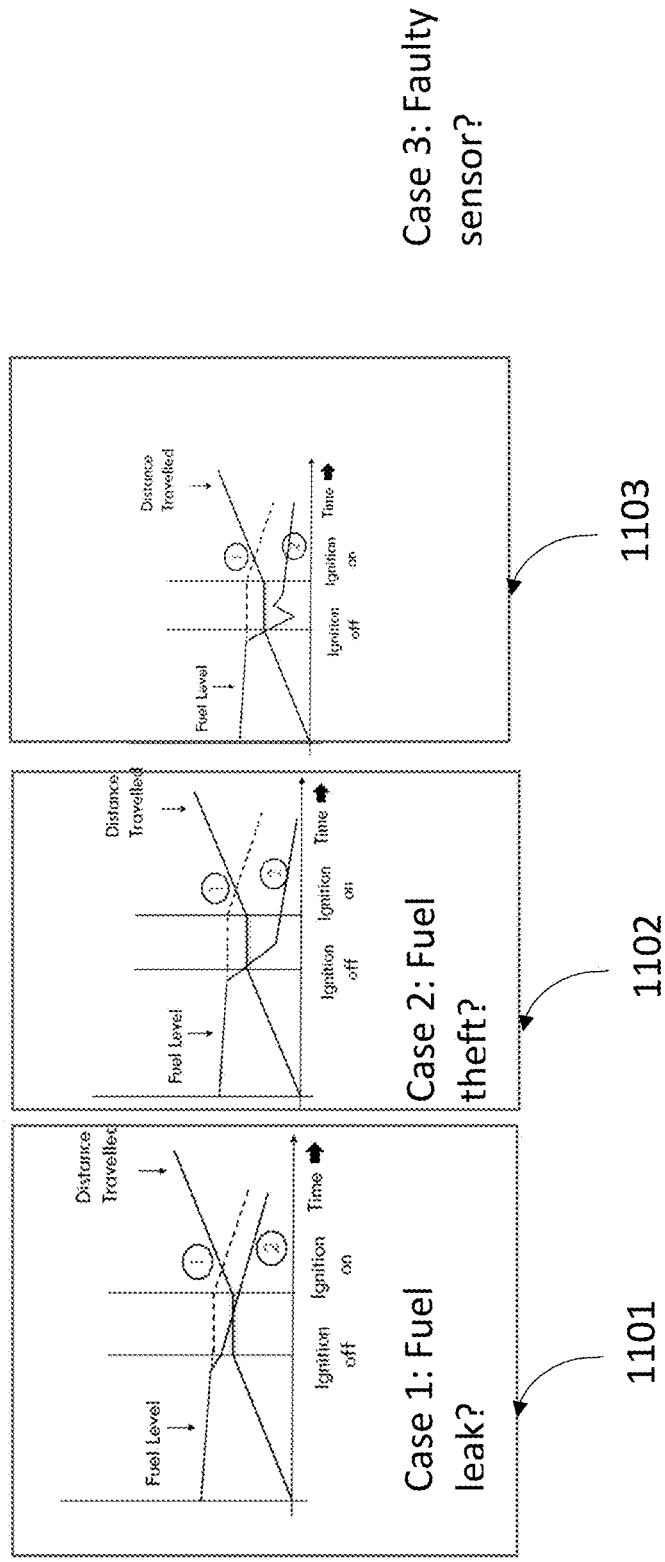
FIG. 11 illustrates the data faults applied to a fuel level datapoint.

FIG. 11 illustrates the data faults applied to a fuel level datapoint. Let us assume that the user wants to test an algorithm that detects Theft of Fuel or Abnormal Fuel Usage. As the vehicle moves, it sends its current Fuel Level Datapoint, which was calculated earlier at regular predefined intervals to the application. To create a Fuel Theft Scenario, a Data Fault such as Linear Decrease can be introduced or a Sudden Drop with Linear Decrease can be introduced to generate fault patterns. The ideal fuel consumed is a function of distance travelled and average mileage of the vehicle and gradually decreases over time as the vehicle travels.

The ideal Fuel Level should be as per Line (1) in each of the cases above. The Line (2) shows the actual values as reported to the application as per different test scenarios. In case 1 1101, the Linear Decrease Data Fault creates a line with a slope greater than the normal. The application should then trigger this as a possible fuel leak alert and not a fuel theft alert. In case 2 1102, there is a 40% drop, followed by Linear Decrease. Case 2 should be triggered by application as a Fuel Theft Alert since such a sudden drop is ideally not possible. In case 3 1103, the fuel level is decreased and increased randomly. Since the data is erratic in case 3, it should be considered as a case of a faulty sensor perhaps.

Dropped Packets: Let us assume an application is displaying route of a vehicle live on a dashboard. Now using a Packet Drop Network fault from the Network Fault Library, the data with Current Location is dropped at random intervals to simulate network drops which are quite common in real-life. If the application does not get all the locations it cannot show a smooth route and hence application behavior can be verified when it does not receive all the data expected.

Firmware Over the Air (FOTA) update of a device inside a vehicle: Let us assume that the firmware of a device needs to be updated remotely. The vehicle could be stationary, moving or moving between network zones (4G to 3G to 2G and so on). It is possible to use the Network Fault Library to throttle bandwidth and delays to see the impact of updating a device remotely.

In real-life devices/things rarely behave independently, they are very often inter-dependent on each other. It is important therefore to simulate a system of things rather than a single device/thing independently. Note in any of the cases it is possible to simulate a single device/thing for unit testing and testing the 'system of things' together for integration/system testing A System of Things could imply any of the following sets.

A set of devices/things 101 that function independently and are also controlled by an application. For example, in a building, the AHU, the motion sensor, the water flow meter, the energy meter all function independently and send data to the application independently. Hence data behavior can be simulated for each of these devices independently, though they may be dependent between datapoints of the device itself. Here "System of Things" just refers to the variety of devices participating in the test.

A set of devices/things 101 that are inter-dependent because of physical proximity and hence must behave in tandem. Consider the example of a greenhouse being monitored by a greenhouse monitoring Application. The greenhouse has multiple temperature, humidity devices for monitoring the conditions and heaters/HVAC devices for controlling the conditions in different zones. The number of devices depends on the size of the greenhouse. The intent is that the greenhouse must be maintained at certain pre-defined conditions for effective vegetation at different times of the day in different climatic conditions. The application decides on the corrective action taking into consideration the average temperature and humidity values across the greenhouse in conjunction with current climatic condition. Hence to generate test the greenhouse monitoring application, it is necessary to simulate data of all the devices in a zone in a coordinated manner so as to simulate real-life situations, or else the testing can become frivolous.

A set of devices/things 101 that are inter-dependent because of environmental or external conditions. Consider the example of a refrigerated truck that reports ambient temperature, humidity, pressure in addition to current location and refrigerated temperature, humidity and power requirements. Now the power required to achieve the set point should obviously be more in a very hot and humid area versus a hot and dry area versus a cool area. Hence while simulating data behaviour of this refrigerated truck, the external factors such as environmental/external conditions should be considered to generate near real-life data.

Figure 16:
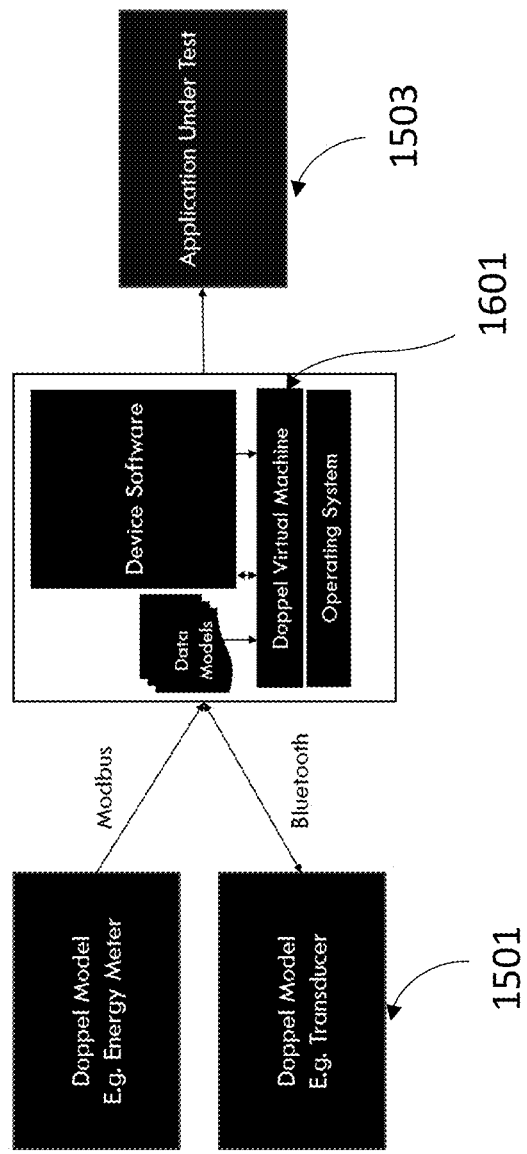
FIG. 16 illustrates a virtual machine Doppel Model.

A set of devices/things 101 that are physically or logically connected to each other to form a system. It may be extremely expensive or infeasible to make each device/thing 101 report its data directly to the application. Hence a set of devices/things may connect to an intermediate device, as a gateway, which in turn can connect the application in a parent-child relationship. This is a common deployment topology and is illustrated in FIG. 16. Hence, when modelling the gateway device, the child devices have to be modelled as well.

A set of Devices/things 101 that are inter-dependent on each other because of the nature of the work flow in a factory or a warehouse or some other site. Each of these have a set Process and Work Flow and therefore devices/things 101 have to work in tandem to recreate the exact workflow.

Figure 12:
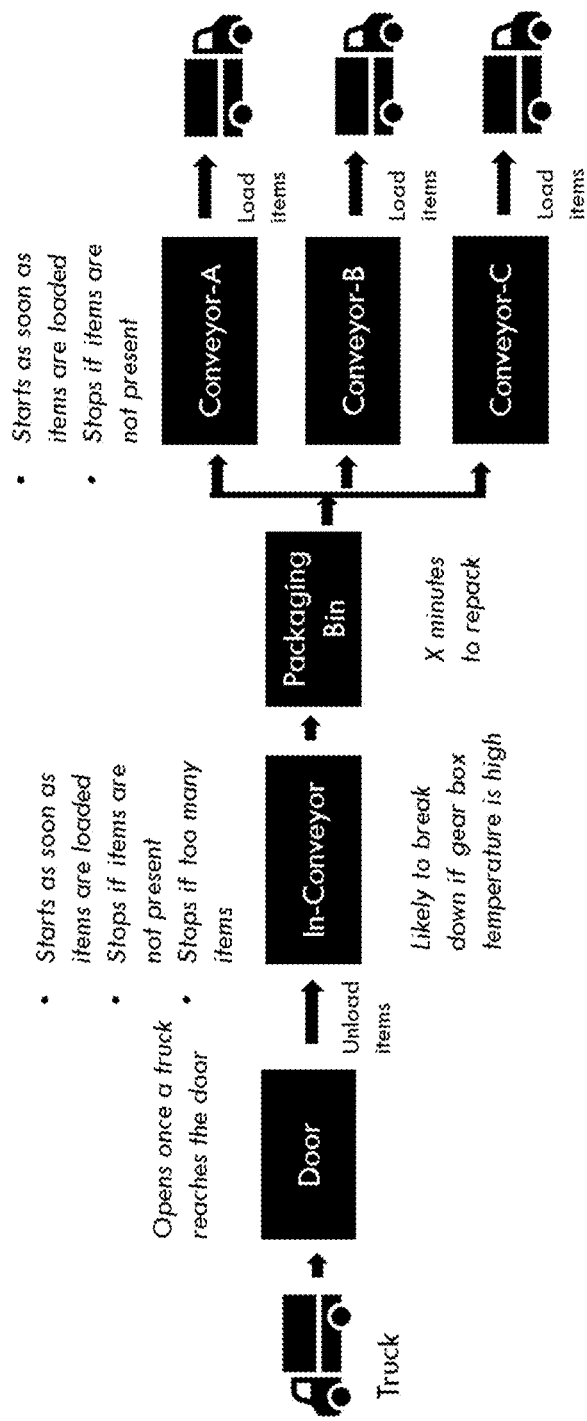
FIG. 12 exemplarily illustrates a work flow topology of a system of things.

Let us take an example of a factory work flow where items are packed and shipped as illustrated in FIG. 12.

The work flow topology of a system of things example is as follows A truck arrives with 'x' no. of items. The door opens when the truck arrives (geo-fence). The items are loaded on the In-conveyor belt. At the end of the conveyor belt, they are unloaded into a packaging bin area. In the packaging bin, the items are packed, labelled and shipped to three different warehouses. Depending on which warehouse to ship to, the items are loaded onto one of the Conveyors and then subsequently into the truck. The conveyors start when there are items, stops either when there are no items or when there are too many items on the conveyor. The entire system is controlled by one or more IoT Applications.

The truck sends the application its current location at periodic intervals and other attributes such as security attributes, no. of items in the truck etc. The application monitors the truck throughout its journey. When the truck reaches the periphery of the factory door, using geo-fencing techniques, the application may send a command to the Door to open if vacant or send instruction to the Truck to wait. The items are loaded onto the in-conveyor, which then starts. The conveyors send data at periodic intervals such as bearing temperature, gear box temperature, speed, no. of items on conveyor and others. If there are no items or greater than the limit of items or no items or a problem is detected with the conveyor belt it shall stop. It shall resume when problem is corrected. In the packaging bin, workers take 'x' minutes to repackage, get the shipping labels from the application for each item. The repacked items are loaded on appropriate conveyors, assume manually. The application then monitors the items on the out conveyors using a tag reader, match the destination and alerts if destination does not match. The application monitors outgoing trucks.

Figure 13:
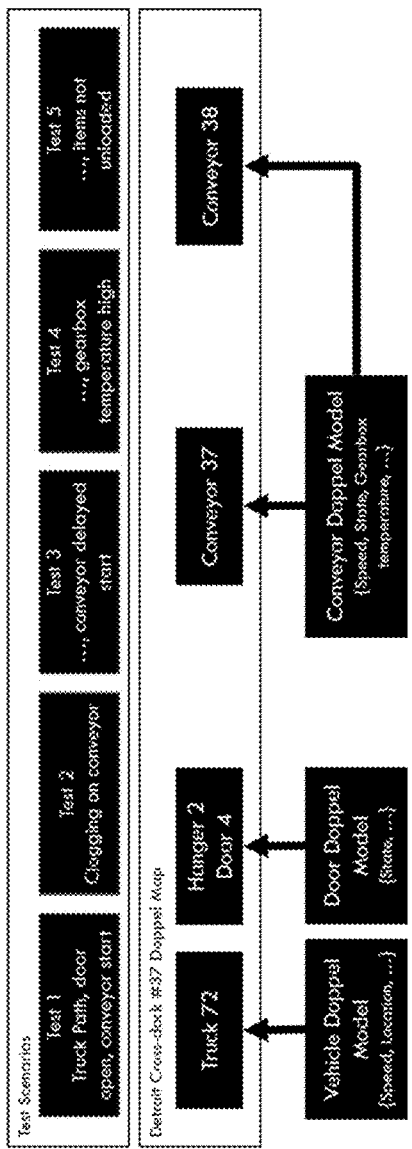
FIG. 13 exemplarily illustrates a process flow in a system of things.

FIG. 13 exemplarily illustrates a process flow in a system of things. In this example, the application under test would need to be verified against multiple scenarios such as effect of breakdown of trucks, many trucks arriving together or conveyor belt fault or item is loaded onto the wrong conveyor and so on. To effectively test the above work flow, simulate this system of things using Doppelio as follows. Create Doppel Models for each of the individual Devices/Things 101 such as Vehicle (as shown in FIG. 4), Door, Conveyor belt. Link the Doppel Models as a "System" using a suitable Work Flow topology map. Define test scenarios for each of the application scenarios to be tested such as Truck arriving late, clogging of the Conveyor belt and so on. Run the Test for the entire "System" and collate & optionally save the results. Verify and run again with recorded data or new data as required.

Figure 14:
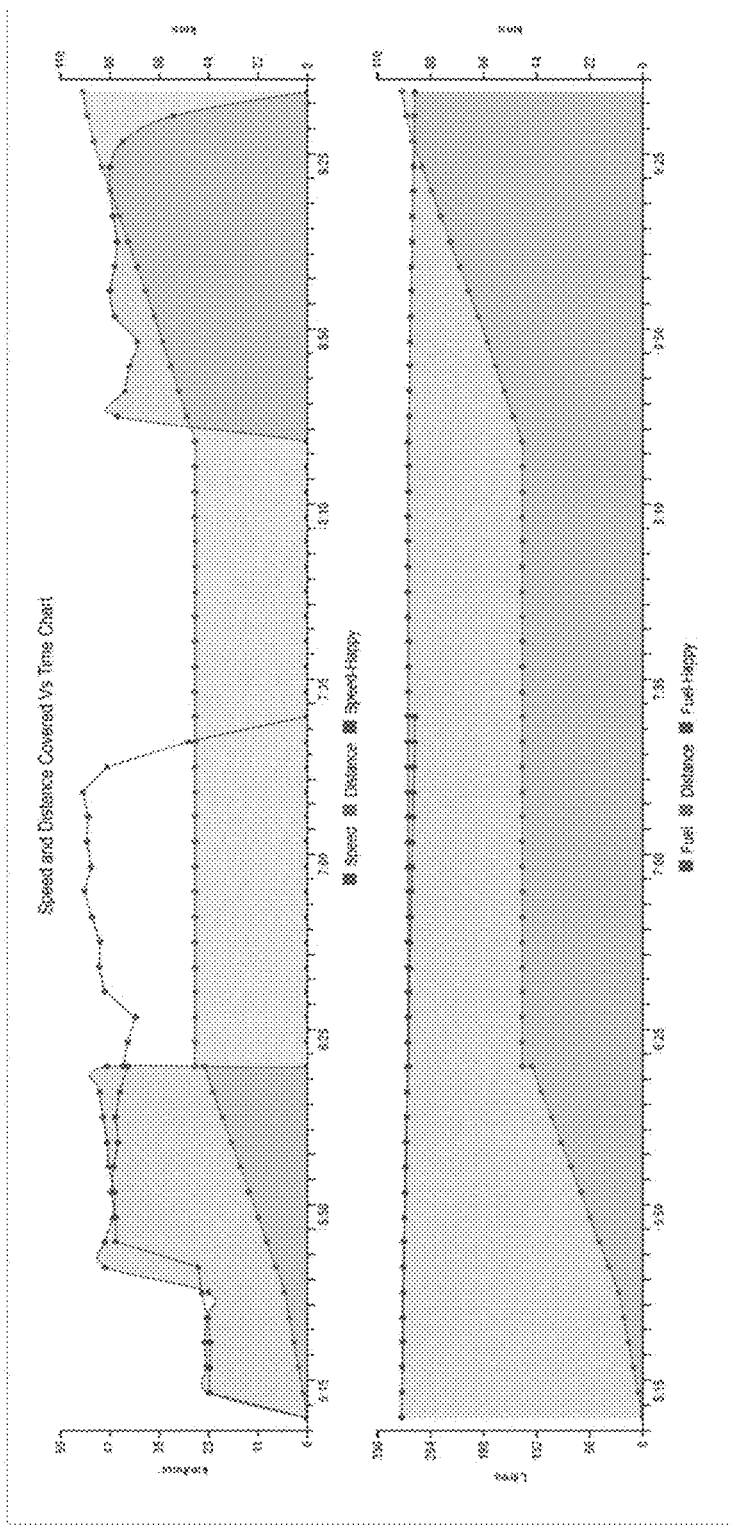
FIG. 14. Exemplarily illustrates a plot of items on conveyors and bearing temperature and shaft current.

The result of running the simulations on this System of Things is illustrated in FIG. 14. FIG. 14 exemplarily illustrates a plot of fuel, distance covered and speed in a break down scenario.

Modelling topologies are described herein. Devices/things often do not behave as individual entities in a real-world deployment. They interact either with other devices or between themselves to create interdependencies.

Deployment topology is described herein. IoT Deployments generally use one of the following deployment topologies. Either devices 101 are directly connected to a central (cloud) application, or devices 101 are connected to a central (cloud) application via a gateway 102 device. The gateway device 102 may be a pass-through device, an aggregator device or an intelligent device. The devices 101 may use a variety of communication, connectivity protocols or IoT Broker platforms for interacting with the application such as the following: communication protocols for example, MQTT, CoAP, HTTP; Connectivity Protocols between the device and the gateway for example, Modbus, OPC, Bluetooth, ZigBee; Network Topologies such as On-Cloud, In-premise; IoT Broker Platforms for example Amazon AWS, Microsoft Azure Thing Works etc.

Doppelio is agnostic to communication, connectivity protocols, IoT Broker and cloud infrastructure. It provides suitable connectors which can be configured to handle each of the above cases.

Figure 15:
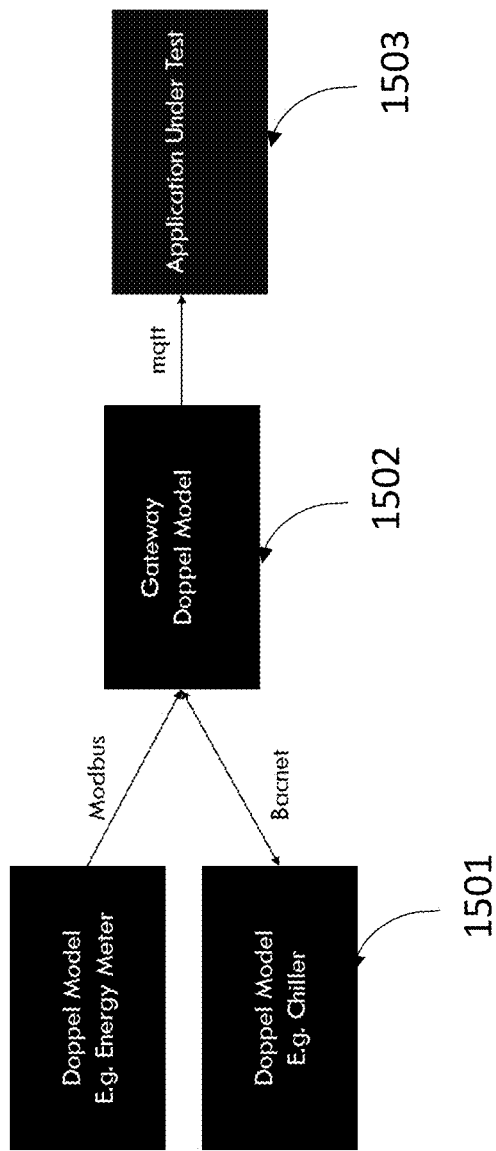
FIG. 15 illustrates an example of parent-child Doppel Model topology.
Figure 18:
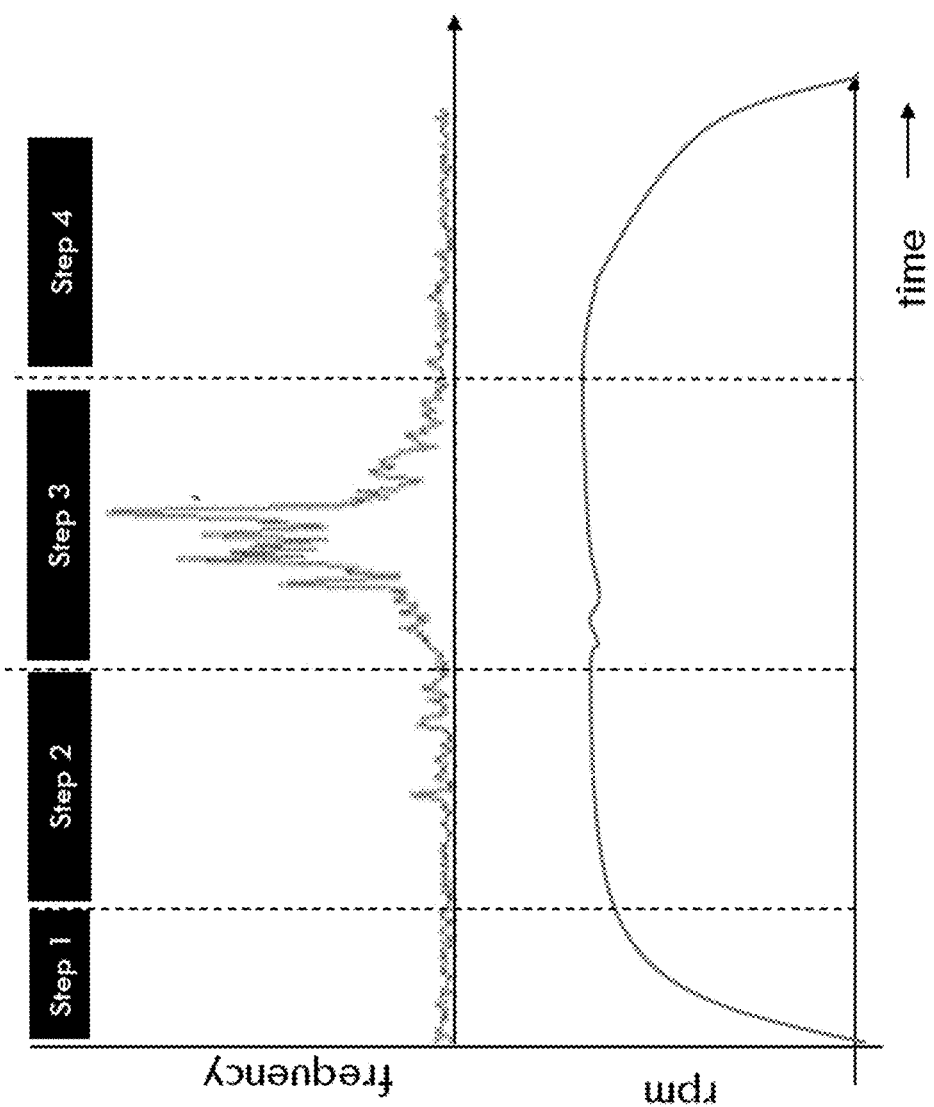
FIG. 18 illustrates test steps of a test case.

FIG. 15 illustrates an example of parent-child Doppel Model topology. When devices 101 are connected through an IoT Gateway, the gateway can also be modelled as a special Doppel Model 1501 as illustrated in FIG. 18. In this case, the Gateway Doppel 1502 model has two child devices and hence can be modelled as a parent-child topology. The gateway Doppel Model 1502 does not have many special characteristics of its own. It is primarily involved in protocol translation and/or aggregation of data from its child devices and sends the telemetry data to Application Under Test 1503. It may also detect alarm cases, such as faults in the devices 101 connected to it, and report the same to the application.

The protocols illustrated in FIG. 15 and FIG. 16 are examples, and not limiting. The Gateway 1502 may do aggregate (or average or some other mathematical operation) data from each of the Devices 101 in addition to protocol translation.

It may not be sufficient to simulate the data behaviour of the Gateway/Device only as a Doppel Model for certain very special requirements such as over-the-air update and so on. It may be required to execute the entire device/thing software/firmware as is and simulate the hardware interfaces inside the virtual device. In this case the virtual device behaves like the device 101 itself and not just a model of the data behaviour of the device.

FIG. 16 illustrates an exemplary virtual machine Doppel Model. The IoT Gateway software can be executed inside a virtual machine as a 'Virtual Machine Doppel Model'.

The components of the Doppel Model 1501 are running inside the virtual device for the purposes of generating data and virtualising hardware. The Doppel Virtual machine 1601 virtualises the hardware interfaces and Data Models that simulates the data behaviour of the device. It can also be used for example to connect to end devices using serial port or wireless interface such as Bluetooth as shown in the diagram above.

A virtual machine Doppel Model executes the actual device software while only the hardware interfaces are virtualized. Let us take an example of obtaining the fan speed of the Device. In a real device, the Device software gets the speed from the actual fan sensor inside the device. In a Virtual Doppel Model configuration, the device software gets the data from the associated virtual hardware interface Data Model.

The Virtual Machine Doppel Model can be used for any device for which the device Image/Software is available.

The physical topology is described herein. In addition to the IoT topology, Doppelio must also address physical deployment topology of Devices, for example, a hierarchy of space such as a building→floor→room, and an air conditioner in the room. The physical topology of devices is a representation of a site or system in the form of nodes. The nodes can be of any depth and any type. Virtual devices can be attached to any node. A test or a simulation can be run at a node level or at system level.

Figure 17:
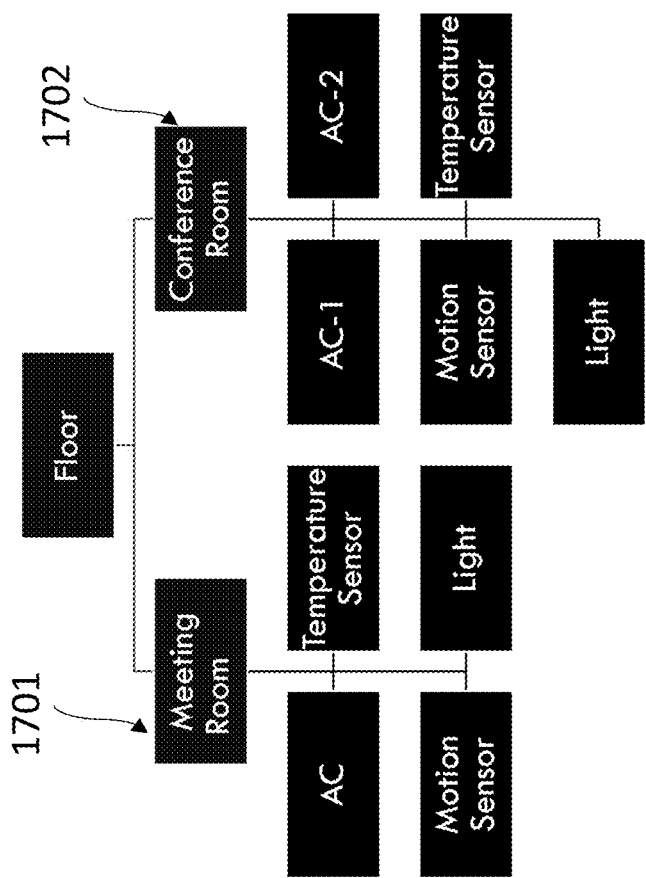
FIG. 17 illustrates a physical topology of virtual devices.

The physical topology is extremely helpful in percolating down certain conditions and for specifying inter-dependency between devices implicitly. FIG. 17 illustrates a physical topology of virtual devices, for example an office floor.

The meeting room 1701 and conference room 1702 indicate the physical spaces, while the other blocks are the actual devices in that physical space and represented here as virtual devices. Each virtual device is an instance of a Doppel Model. For example, AC is an instance of the Doppel Model "HVAC".

When modelling "System of Things", physical topology if defined, plays a definite role in controlling and defining interdependencies implicitly. For example, if the motion sensor of meeting room is triggered due to presence of people in the meeting room, it should turn on the light of the meeting room only and not of both meeting room and conference room.

In addition, tests can be executed at node level for example meeting room or conference room level or office level or for an individual device. When the test is run at a node level, tests shall be run for all devices connected to the node.

Virtual Devices are only "logically" connected by a Physical or Workflow topology. They may still be physically connected through one or more Gateways 102 or can be connected directly also. Hence to simulate a System of Things behavior, one needs to take into account both the logical and physical connections.

Modelling Test Scenarios are described herein. A test scenario includes a collection of test suites, test cases and test steps. A test suite consists of test cases which in turn consist of test steps. The test steps help define behaviour of the device 101 over a time graph, which are then played back to generate real and anomalous data streams.

A test step is the smallest unit of execution and defines the behaviour of one or more virtual devices and datapoints or fault conditions over a period of time.

When a test/test session starts, the virtual devices are first instantiated and then test cases are executed. For each test case, the test steps are executed one after the other. A test step shall execute and move to the next test step when: duration of time or no. of iterations has exceeded; some condition/value of a datapoint is reached; a command is received from application. Test steps may also be configured to execute concurrently, to manipulate other characteristics of the virtual device. Test cases may also be executed concurrently to manipulate multiple devices. Multiple tests of virtual devices can run in parallel so as to enable load testing of the application under test.

FIG. 18 illustrates exemplarily test steps of a test case. The purpose of this test case is to ascertain application behaviour if the vibration of the motor has a sudden spike, leading to a potential problem in the motor.

Step 1: Start the Motor. Let the "speed/rpm" of the motor rise until it reaches value X. Measure and report the RPM and Vibration Step 2: Motor is in steady state. Let it run in steady state for about 5 minutes Step 3: Generate a Spike Fault in the Vibration for about 5 minutes Step 4: Stop the Motor Consider a greenhouse with two zones, two temperature sensors each and two air conditioners (AC).

The test steps are as described as follows:

Step 1: Initialize and Get Ambient Temperature of Place X

Step 2: Report Average temperature of Zone 1 and Zone 2 for 15 minutes or till command Step 3: If Command Received, switch on AC-1

Step 4: Report Average temperature of Zone 1 and Zone 2 for 15 minutes

Figure 19:
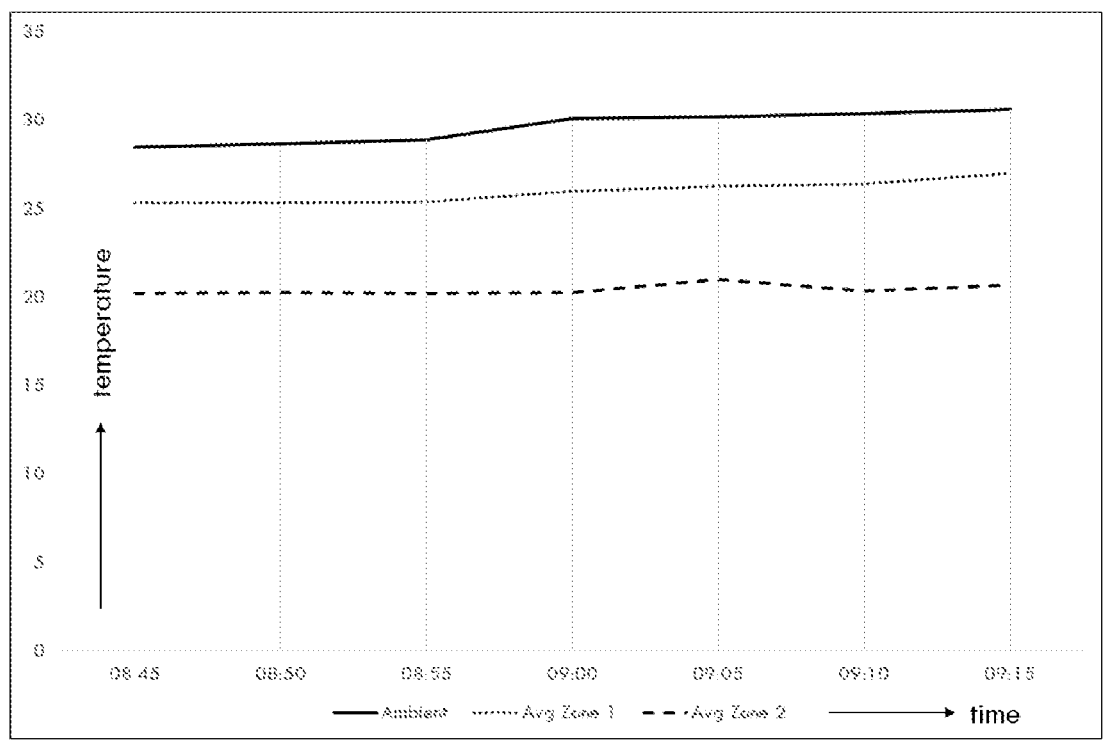
FIG. 19 illustrates a plot of ambient and average temperatures of Zone 1 and Zone 2 for test step 2.

FIG. 19 illustrates a plot of ambient and average temperatures of Zone 1 and Zone 2 for test step 2. The ambient temperature is obtained from an actual weather site and is quite high at around 30 C for this place in the morning. Due to the impact of sunlight on the eastern part of the Greenhouse, as per data simulation, Zone 1 reports higher temperatures than Zone 2 as shown in FIG. 19.

Figure 20:
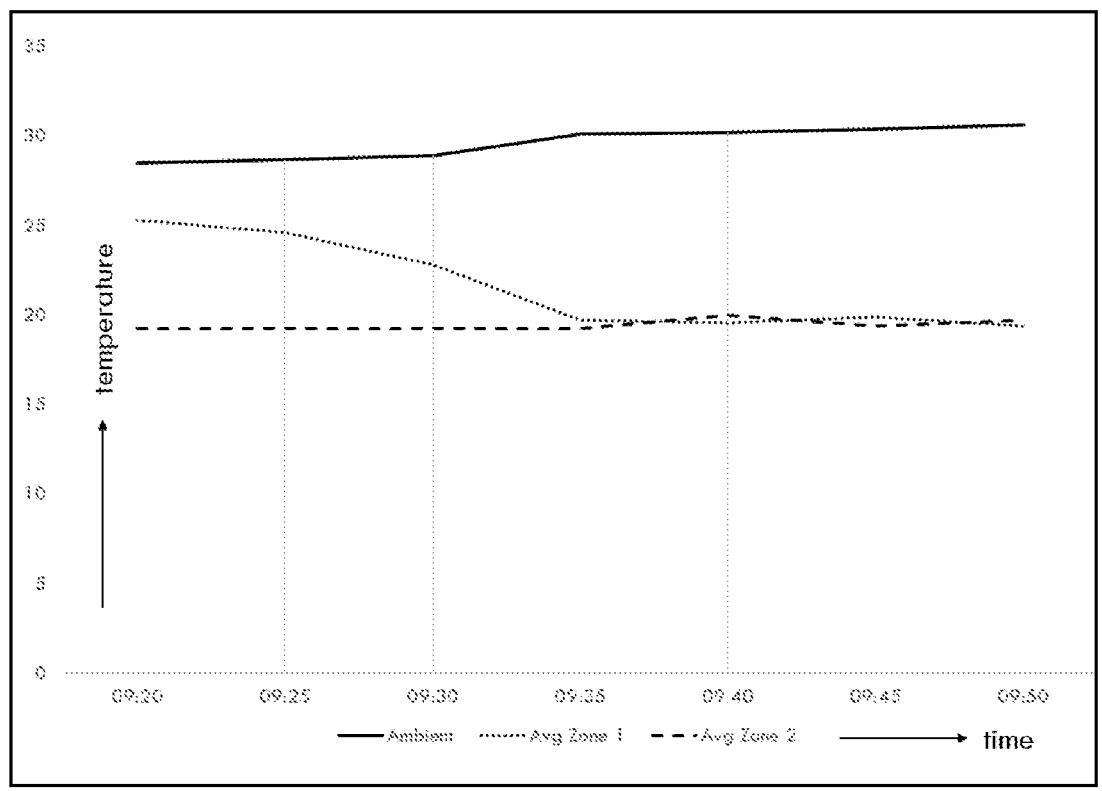
FIG. 20. Illustrates a plot of ambient and average temperatures of Zone 1 and Zone 2 for test Step 4.

FIG. 20. illustrates a plot of ambient and average temperatures of Zone 1 and Zone 2 for test Step 4. FIG. 20 illustrates the data simulation results during Step 4 i.e. after AC-1 has switched on. The temperature of Zone 1 decreases and temperature of Zone 2 also shows marginal decrease because of the effect of Zone 1 AC.

Thus, by defining Test Steps and conditions in each Test Step, a Test Case/Test Scenario can be executed.

Doppelio can be used for all kinds of testing as defined in the Software Engineering Paradigm such as Unit Testing, Integration Testing, System Testing, Load Testing, Regression Testing and so on.

Disclosed herein is an exemplary problem statement. A device vendor is developing a new version of the control unit of an industrial air conditioner (AC) and several new intelligent cloud applications to monitor the AC. The device vendor would like to test the AC units end-to-end so as to verify the behavior of the devices in both normal and simulated abnormal conditions, before the units are installed in the field.

Figure 21:
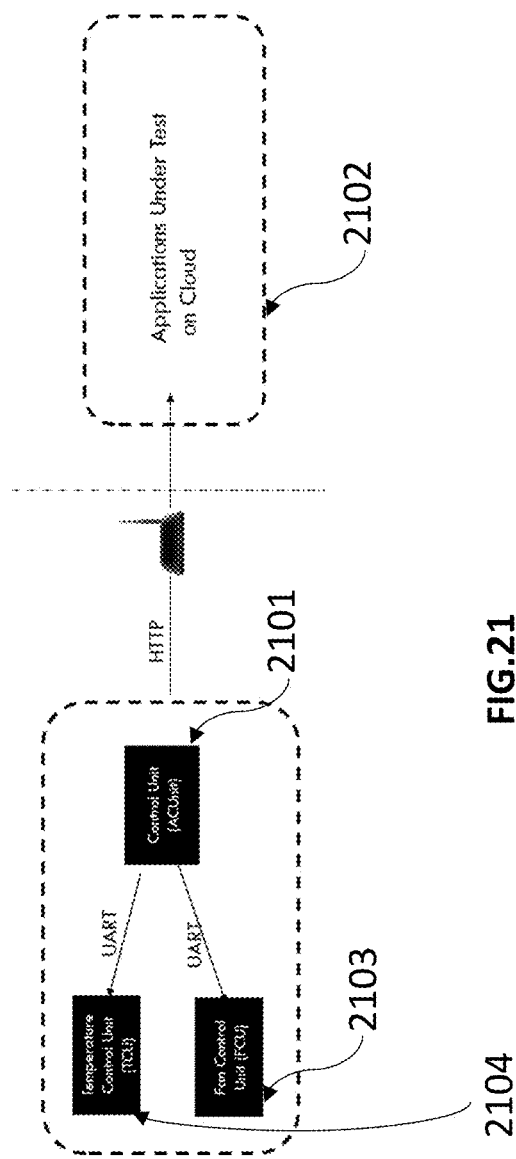
FIG. 21 exemplarily illustrates a modelled AC unit.

Doppelio can be used for testing the AC Units end-to-end. FIG. 21 exemplarily illustrates a modelled AC unit. In this exemplary solution, only the following sub-systems of an industrial AC have been considered—Fan Control Unit (FCU), Temperature Control Unit (TCU) and Control Unit (AC Unit) as shown in FIG. 21.

The Control Unit (AC Unit) 2101 controls the various operations of the AC as per commands received from the user such as Start the AC, set the Temperature Set point, increase fan speed etc. It also processes the data received from FCU, TCU and others and relays the information to the Cloud based Applications 2102 for preventive maintenance, customer support and such other purposes. The software running on the control unit is also referred to as Control Application.

The Fan Control Unit 2103 controls the fan function of the AC. It starts when the control unit sends a command to start the fan. The speed is controlled by the user. The FCU reports its status, fan speed and vibration to the Control Unit every x seconds. The Temperature Control Unit 2104 has sensors to report the current temperature and humidity. It allows user to set the Temperature and Humidity set points. The TCU controls the temperature when the FCU is switched on.

For end-to-end testing of the device both the Control Application Software and Cloud Applications have to be tested simultaneously. Since the Control Application software is running on a proprietary hardware board, a Virtual Machine Doppel (VM Doppel) construct is used to virtualise the Control Application Software so that the system can be tested end-to-end using software thereby reducing dependence on hardware.

Since the FCU 2103 and TCU 2104 units have not changed in this version of the product and are known to be very stable, the FCU 2103 and TCU 2104 units have been modelled as black-box Data Doppels.

Figure 22:
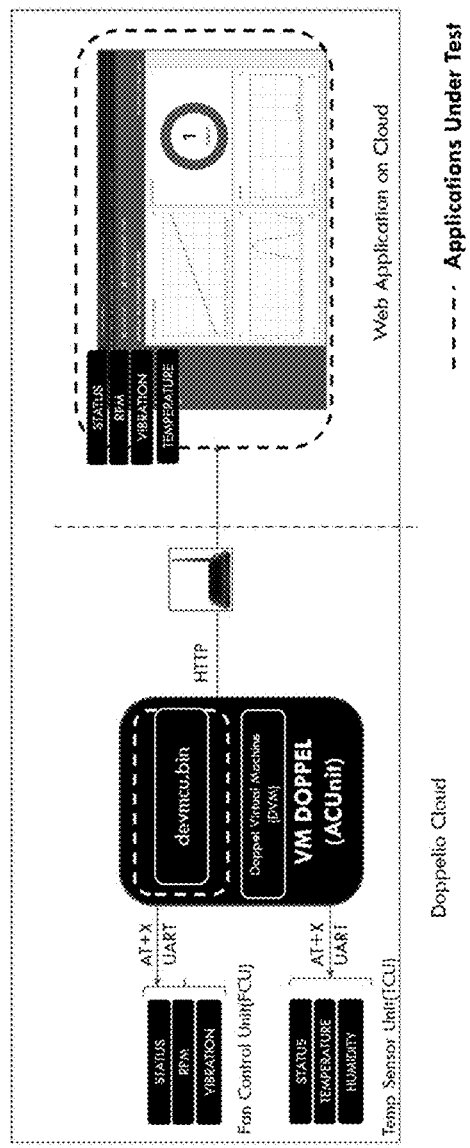
FIG. 22 illustrates the block diagram of FCU, TCU and AC Unit Models.

Using this implementation, the following aspects of Doppelio shall be demonstrated:

1. Ability to model and generate different data patterns for FCU 2103 and TCU 2104 as Data Doppels
2. Ability to model the Control Unit as a VM Doppel and emulate the actual code that is running on the board and its hardware peripherals in software
3. Ability to model the FCU 2103, TCU 2104 and Control Unit 2101 as a single System of Things which depend on each other
4. Ability to run Data scenario Tests with no changes to any of the Data or VM Doppels
5. Ability to run Network Tests with no changes to any of the Data or VM Doppels
6. Ability to run tests for multiple AC Units concurrently and thereby load the applications under test The Fan Control Unit (FCU) 2103 and temperature Control Unit (TCU) 2104 are modelled as Data Doppels whereas the Control Unit (ACUnit) is modelled as a VM Doppel as illustrated in FIG. 22.

Figure 23:
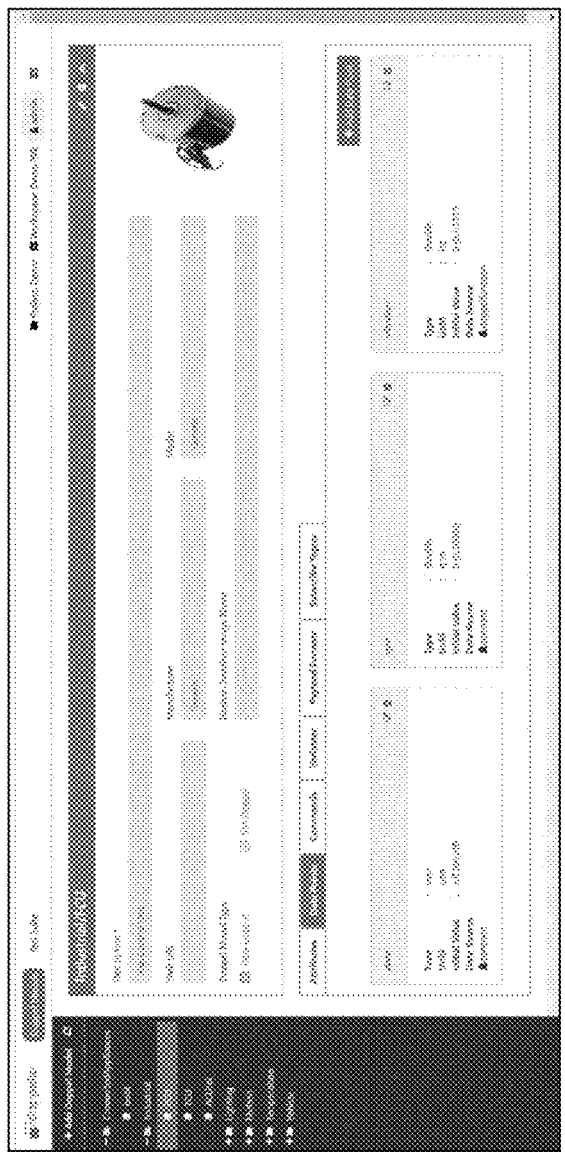
FIG. 23 illustrates a screenshot of the FCU Doppel Model.

The datapoints of the FCU Data Doppel Model is illustrated in FIG. 23 as a screen shot taken from the Doppelio Web Application. Also listed are the TCU 2103 and ACUnit Doppel Models.

The FCU Doppel has 3 datapoints primarily viz
state: Control and monitor state of the FCU (not power on state)
rpm: speed of the Fan is a constant value here. It will be varied to different values during test execution
vibration: Vibration of the AC Unit. Here it is modelled as a Doppel Function that makes vibration a function of the RPM. As the RPM varies, vibration also shall vary. When the RPM is 0, the machine shall have an idle vibration, if powered on.

The TCU Doppel has primarily 2 data points and 2 variables. The variables are:
temperatureSetPoint: This is the desired temperature when the AC is running in steady mode
humiditySetPoint: This is the desired humidity when the AC is running in steady mode The variables can be to the desired values during a test
The datapoints reflect the sensors present in the unit and are:
temperature: actual temperature measured by the sensor. The temperature is calculated as a function of the following using a User Defined Function. It is dependent on
Initial Value which is the ambient Temperature of the place where this is being tested (E.g. could be 5 C in Sweden or 40 C in Dubai)
state of the FCU (FCU.state.value)
speed of the Fan (FCU.rpm.value)
rate of decrease per min (constant configurable parameter)
humidity: actual humidity measured by the sensor. Humidity is not modelled in this implementation and set as constant as 60.

Figure 24:
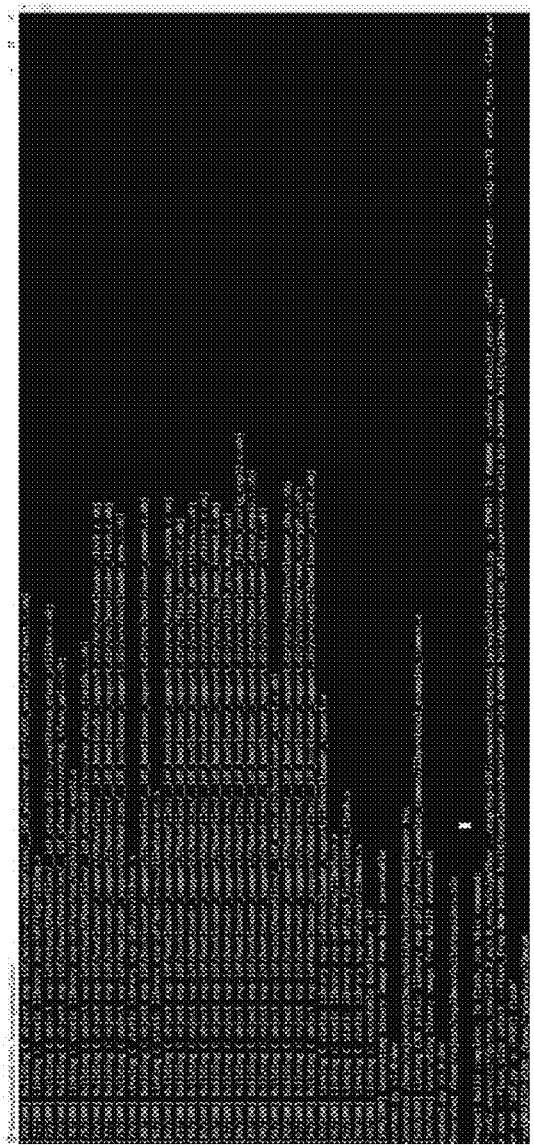
FIG. 24 illustrates the creation of a "flashable" binary image.

As stated earlier, the ACUnit and the Control Application are modelled as a VM Doppel Model. Brief details of the Control Unit are as follows:
The Control Unit is based on 32-bit ARM based SoC (System On Chip) processor
The Control Application runs on a real-time operating system such as FreeRTOS.
It interacts with the FCU, TCU using AT Commands (Proprietary protocol) over UART and with the Cloud Application(s) using http(s) over Ethernet.
The controller application along with partition, and bootloader are built and flashed into a single "bin" file using arm-gcc-toolchains and processor based IDE (Integrated Development Environment) for example esp-idf (https://github.com/espressif/esp-idf) framework as shown in FIG. 24. This image can be then be downloaded onto the Control Unit and executed.

Doppelio provides libraries and tools to virtualise this image that can run on actual hardware and run it on top of commodity hardware or virtualization constructs like VM/Containers/etc. The layer that facilitates the CPU emulation and hardware virtualization is called Doppel Virtual Machine (DVM), and the Device Software packaged along with tools and libraries to make it run on the DVM is called Doppel Virtual Machine Image.

The DVM Image is instantiated and executed on the test infrastructure as required during test execution.

Three test scenarios are described herein.

Figure 25:
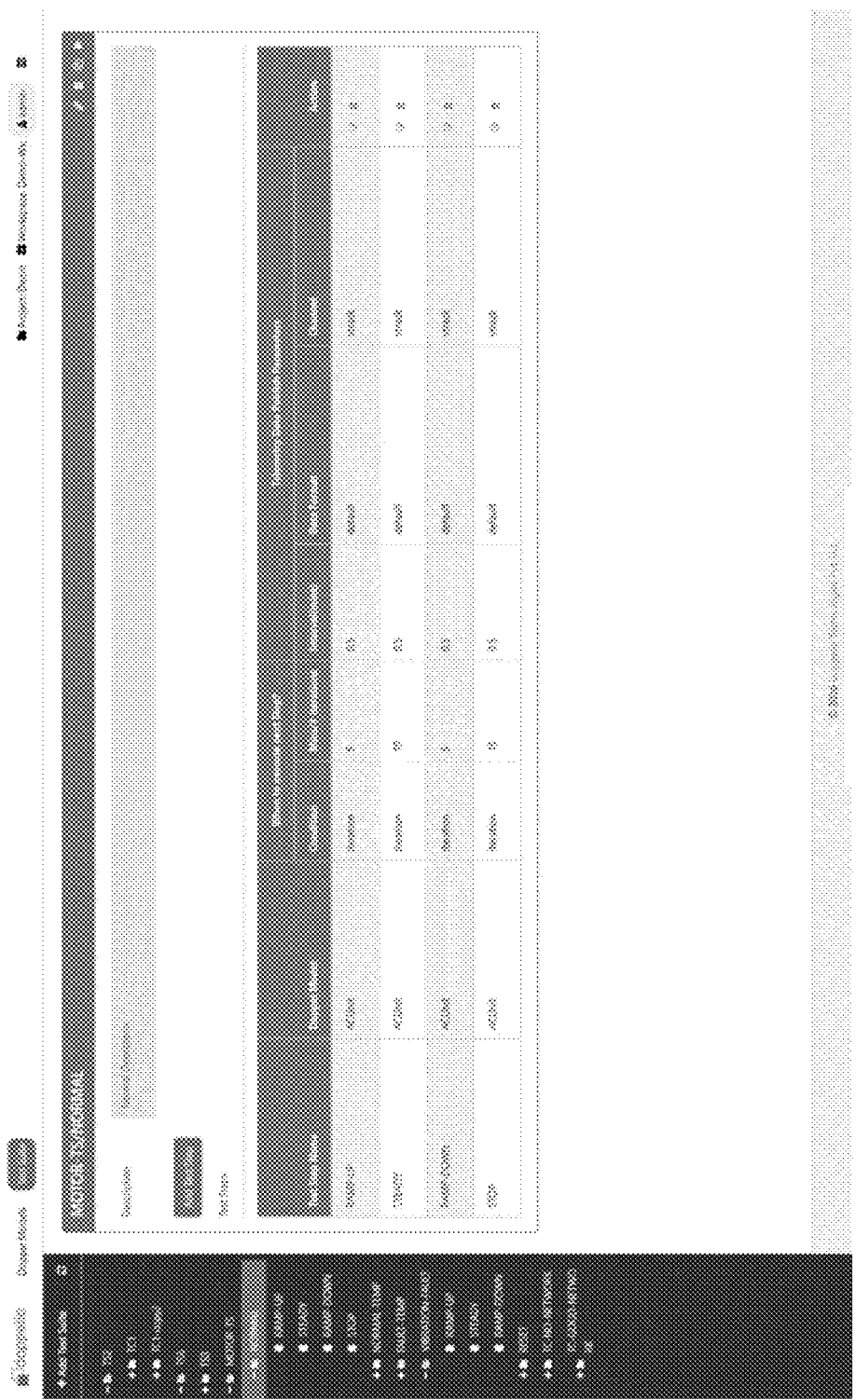
FIG. 25: illustrates the test steps of "NORMAL" Test Case.

In the normal test case scenario, the following tests are performed.
1. RESET: System is powered on
2. RAMPUP: FCU is switched on, rpm is increased gradually from 0 to 300 rpm
3. STEADY: FCU is on, rpm is kept steady and varied in the range of 300-400 rpm
4. RAMPDOWN: FCU is on, rpm is decreased linearly from 350 to 0
5. STOP: FCU is off
As we control the speed of the rpm, vibration and temperature vary as per their respective data functions. Please also note, we are varying the value of the RPM of the FCU.
The simulation engine, publishes the values of the datapoints and variables of all the devices to the appropriate DVM inside a VM Doppel. The Control application reads the values from DVM using a virtualised serial port interface. The Control application thinks that the values are coming from real hardware but in reality, the data is coming from Doppelio's simulation engine. The control application processes the data received and sends the telemetry data to the cloud application,
The time duration for which each step should be executed and sequence is as shown in FIG. 25.

Figure 27:
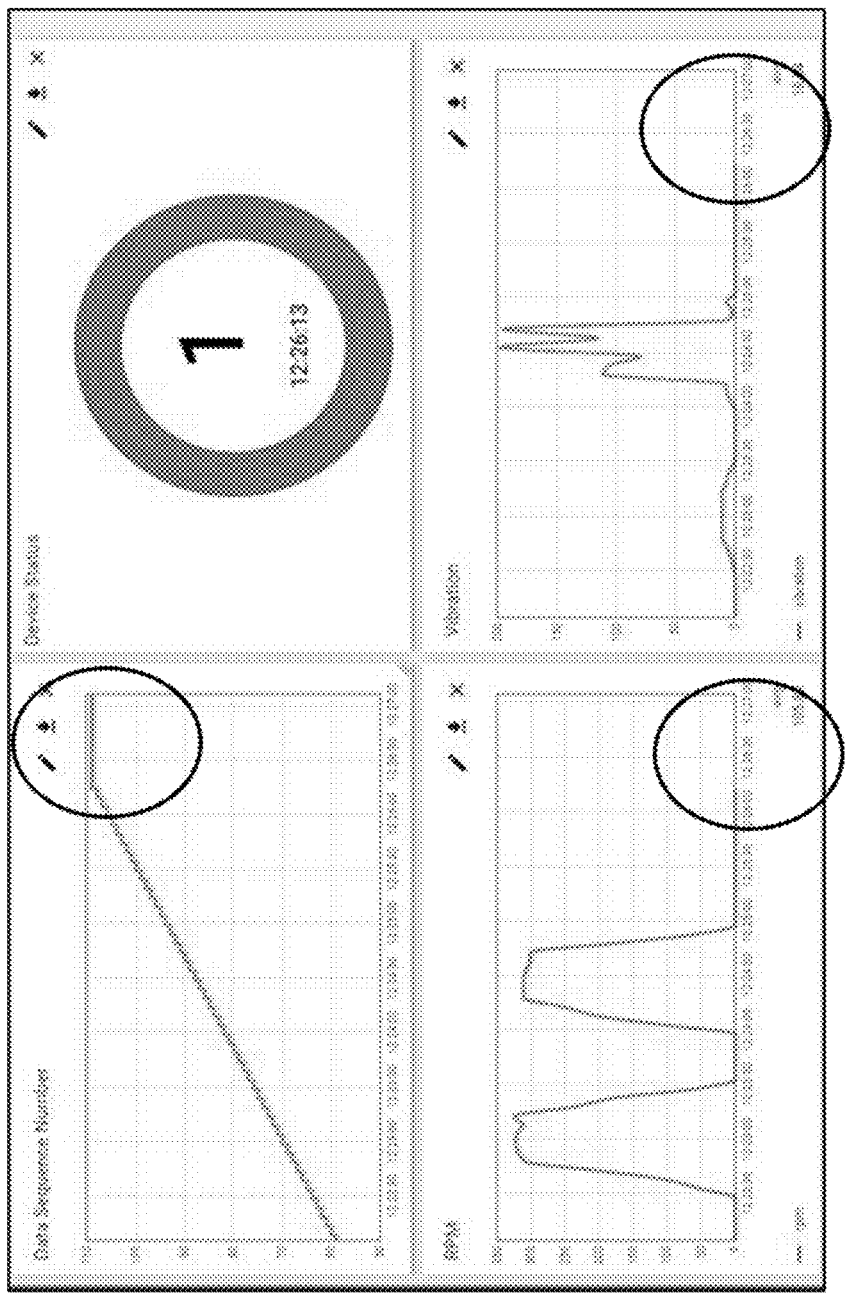
FIG. 27 illustrates the results of TC-NO-NETWORK test case.

In the VIBRATION-FAULT test case, the following steps are performed
1. RESET: System is powered on
2. RAMPUP: FCU is switched on, rpm is increased gradually from 0 to 300 rpm
3. STEADY: FCU is on, rpm is kept steady and varied in the range of 300-400 rpm. During this phase a Above-Threshold Data Fault is introduced for the vibration data point.
4. RAMPDOWN: FCU is on, rpm is decreased linearly from 350 to 0
5. STOP: FCU is off
In the CONTROLLING the Network tests, the TC-NO-NETWORK is run first. As is shown in FIG. 27, no data is sent to the application. After a while, TC-GOOD-NETWORK is run which restores the network and data is sent again to the application.

As stated above, there is no change to any of the Doppel Models (Data Doppel or VM Doppel) while running any of these tests.

In addition to running tests for a single device, the same test (NORMAL/VIBRATION-FAULT/others) can be run for multiple devices simultaneously by changing the Run how many simultaneous tests field. Such tests may be executed by specifying a ramping profile to simulate different distributions of load.

The results on running the test cases are taken from a sample dashboard application.

Figure 26:
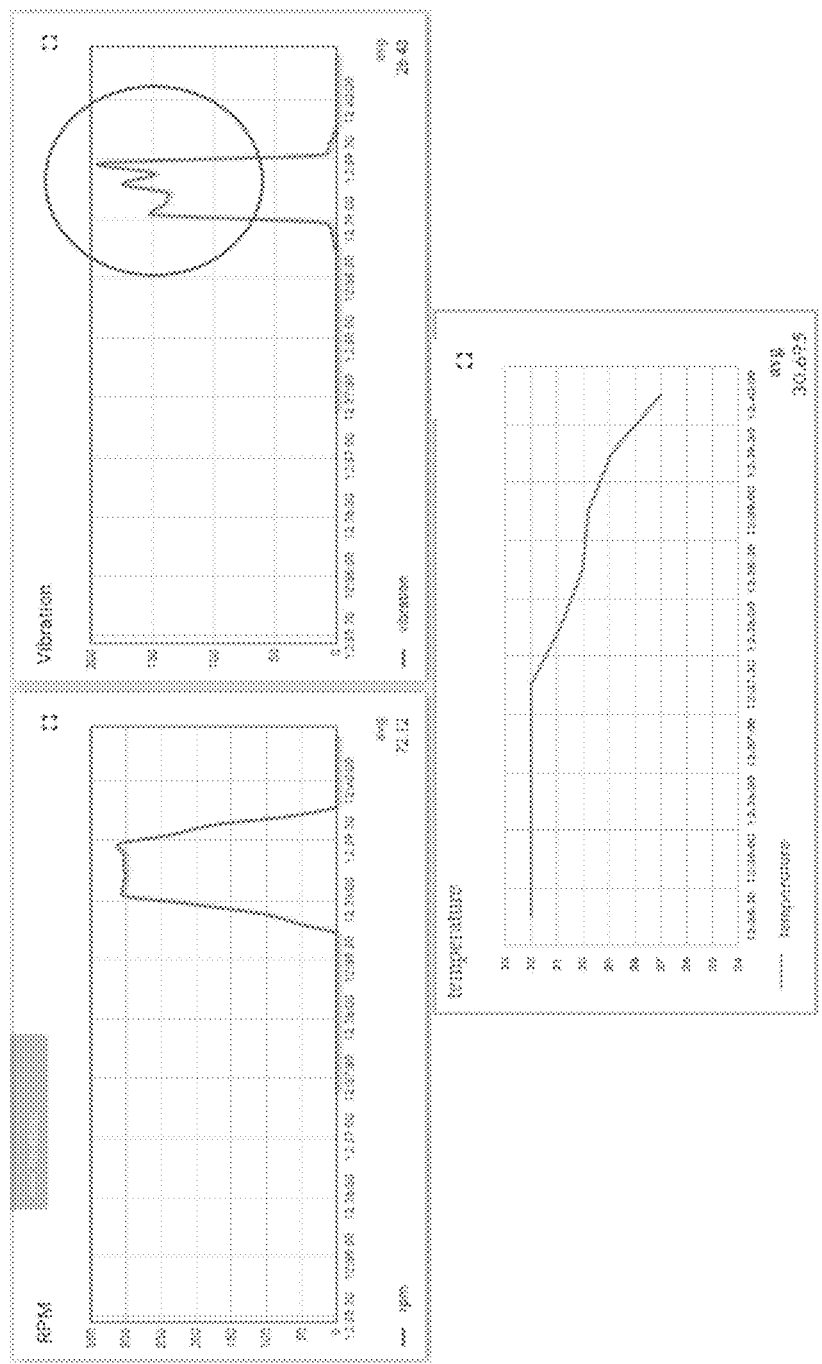
FIG. 26 illustrates the results of "VIBRATION-FAULT" Test Case.

FIG. 26 illustrates the results when the VIBRATION Fault Test Case is run. The spikes in vibration have been highlighted in the figure FIG. 27 illustrates the results when TC-NO-NETWORK test is executed. The portions have been highlighted in FIG. 27. FIG. 27 also illustrates the results when NORMAL and VIBRATION-FAULT Test cases are executed.

The foregoing examples have been provided merely for explanation and are in no way to be construed as limiting of the system and method for device virtualization and simulation disclosed herein. While the aforementioned system and method has been described with reference to particular embodiments, it is understood that the words, which have been used herein, are words of description and illustration, rather than words of limitation. Furthermore, although the system and method has been described herein with reference to particular means, materials, and embodiments, the system and method is not intended to be limited to the particulars disclosed herein; rather, the design and functionality of the system and method extends to all functionally equivalent structures and uses, such as are within the scope of the appended claims. While particular embodiments are disclosed, it will be understood by those skilled in the art, having the benefit of the teachings of this specification, that the system and method disclosed herein is capable of modifications and other embodiments may be effected and changes may be made thereto, without departing from the scope and spirit of the system and method disclosed herein.

We claim:

1. A system for device virtualization and simulation of behaviour of a system of things for testing Internet of Things (IoT) applications, said system comprising a non-transitory computer readable storage medium configured to store computer program instructions defined by modules of said system; and at least one processor communicatively coupled to said non-transitory computer readable storage medium, said at least one processor configured to execute said computer program instructions defined by said modules of said system, said modules comprising:
   a modelling engine for defining attributes, data transfer protocols, and normal data behaviour of a physical device and for defining virtual devices that can co-exist with the physical device and can be used to simulate the virtual devices, a gateway, and to simulate a network associated with the virtual devices;
   a test suite designer for defining the device data behaviour under various test conditions;
   a simulation engine to generate test data streams for various test scenarios as required by a software tester, wherein said simulation engine end-to-end simulates said IoT Applications that are running on a cloud or an edge; and
   a reporting engine for generating various types of test reports.

2. The system of claim 1, wherein said modelling engine is configurable, and models various topologies including IoT deployment, physical and workflow topologies to simulate a system of things application realistically.

3. The system of claim 1, wherein said modelling engine generates a data model of an IoT device generically to include all datapoints, properties, commands, payload formats and protocols for either physical and software devices.

4. The system of claim 1, wherein said modelling engine automatically creates a data model of a device from pre-recorded data streams and from existing models using suitable protocol translators or using inbuilt data generators.

5. The system of claim 1, wherein said modelling engine models and defines real-time data characteristics of a device or a set of devices, varying with time in a configurable manner using a combination of pre-recorded data, statistical, spatial or temporal models.

6. The system of claim 1, wherein said modelling engine models various positive and negative test scenarios, varying with time, for a device or a set of devices to test the applications against real-world conditions.

7. The system of claim 1, wherein the simulation engine simulates real-world situations over periods of time using inbuilt and, or user-defined generators.

8. The system of claim 1, wherein said simulation engine defines behaviour responses to incoming commands and varies said responses to simulate real-world situations.

9. The system of claim 1, wherein the simulation engine models faulty behaviour of a device or a set of devices to simulate real-world conditions using inbuilt network and data fault generators, including pre-defined templates for simulating standard networks including RF networks.

10. The system of claim 1, wherein said virtualization and simulation system for Internet of Things is used across a software development life cycle for various types of record of testing such as load, functional, integration, system testing, regression testing, pre-release, post release troubleshooting integrated with various phases of a continuous integration/development project.

11. The system of claim 1, wherein said virtualization and simulation system for internet of things is a configurable system that is agnostic to communication, connectivity protocols, IoT broker and cloud infrastructure.

12. The system of claim 1, wherein said virtualization and simulation system for internet of things is designed as a low code system such that a user can execute all functions without having to write any code using a combination of an user interface based application, APIs and scripts.

13. The system of claim 1, wherein a user can write functions to complement inbuilt data generators using a scripting language to create complex scenarios.

14. The system of claim 1, wherein said virtualization and simulation system for internet of things generates virtual devices, that can be data models or actual virtual machines with hardware interfaces simulated.

15. The system of claim 1, wherein said testing is conducted to simulate real world conditions overtime.

16. The system of claim 1, further comprising a recording module that records the simulated and generated data during a test and conducts a playback for regression testing.

17. A method of device virtualization and simulation of behaviour of a system of things for testing Internet of Things (IoT) applications, said method employing at least one processor configured to execute computer program instructions for performing said method comprising the steps of:
  defining attributes, data transfer protocols and normal data behaviour of physical devices and for defining virtual devices that can co-exist with the physical devices and can be used to simulate the physical devices, a gateway, and to simulate a network associated with the physical devices and virtual devices;
  simulating end-to-end one or more IoT Applications that is miming on a cloud or an edge;
  defining the data behaviour under various test conditions of said physical and virtual devices;
  generating test data streams for said test conditions as required by a software tester;
  and generating test run reports.

18. The method of claim 17, wherein a user can execute all functions without having to write any code using a combination of a user interface based application, APIs and scripts.

19. The method of claim 17, further comprising the step of automatically creating a data model of a device from a pre-recorded data stream or from existing models.

20. The method of claim 17, wherein the step of modelling further comprises defining real-time data characteristics of a device or a set of devices, varying with time in a configurable manner using a combination of pre-recorded data, statistical, spatial or temporal models.

21. A system for device virtualization and simulation of behaviour of a system of things for testing IoT applications, said system comprising a non-transitory computer readable storage medium configured to store computer program instructions defined by modules of said system; and at least one processor communicatively coupled to said non-transitory computer readable storage medium, said at least one processor configured to execute said computer program instructions defined by said modules of said system, said modules comprising:
  said system of things comprising physical devices or things that are interdependent because of physical proximity, environmental conditions, physical or logical connections, or nature of work flow, wherein datapoints from at least one of the physical devices or things is dependent on at least one of other physical devices or things;
  a modelling engine that applies one or more data twins, wherein said one or more data twins is a model of the physical devices or things including its data characteristics over time, and wherein constituents of said one or more data twins comprises identity, attributes, datapoints or sensors, variables, actuation commands, protocols, and formats of the data and communication channel, and wherein said one or more data twins define attributes, data transfer protocols, and normal data behaviour of the physical devices, and wherein said one or more data twins is a generic template for modelling the physical devices, and for defining virtual devices that can co-exist with the physical devices, and can be used to simulate the virtual devices, gateway, and to simulate a network associated with the physical devices and the virtual devices;
  a test suite designer for defining the device data behaviour over time under various test conditions, and for defining network characteristics and faulty data of said one or more data twins;
  a simulation engine to generate test data streams for said various test conditions as required by a software tester; and
  a reporting engine for generating various types of test reports utilizing said generated test data streams.

* * * * *